United States Patent
Nakajima

(10) Patent No.: US 7,145,575 B2
(45) Date of Patent: Dec. 5, 2006

(54) COLOR IMAGE PROCESSING DEVICE, COLOR IMAGE PROCESSING METHOD, RECORDING MEDIUM, AND PROGRAM

(75) Inventor: Nobuyuki Nakajima, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/742,212

(22) Filed: Dec. 18, 2003

(65) Prior Publication Data
US 2004/0135793 A1    Jul. 15, 2004

(30) Foreign Application Priority Data
Dec. 27, 2002  (JP)  .............. 2002/380876
Jan. 6, 2003   (JP)  .............. 2003/000388

(51) Int. Cl.
G09G 5/02       (2006.01)
(52) U.S. Cl. .............. 345/591; 345/591; 345/593; 345/594; 345/597
(58) Field of Classification Search .............. 345/589, 345/591, 593, 594, 597
See application file for complete search history.

(56) References Cited

U.S. PATENT DOCUMENTS

| | | | |
|---|---|---|---|
| 6,044,173 A | | 3/2000 | Kumada |
| 6,266,152 B1 | | 7/2001 | Nakajima |
| 6,518,975 B1 | * | 2/2003 | Kulkarni et al. ............ 345/589 |
| 6,687,022 B1 | * | 2/2004 | Lapstun et al. .............. 358/1.9 |
| 6,825,941 B1 | * | 11/2004 | Nguyen et al. ............ 358/1.15 |
| 6,857,726 B1 | * | 2/2005 | Silverbrook .................. 347/43 |
| 2002/0154325 A1 | * | 10/2002 | Holub ........................ 358/1.9 |
| 2003/0048464 A1 | * | 3/2003 | Yamada et al. .............. 358/1.9 |
| 2003/0052895 A1 | * | 3/2003 | Akiyama et al. ........... 345/589 |
| 2003/0071823 A1 | * | 4/2003 | Fukasawa ................... 345/589 |
| 2003/0112334 A1 | * | 6/2003 | Kiyokawa ................. 348/207.1 |

FOREIGN PATENT DOCUMENTS

| | | |
|---|---|---|
| JP | 7-222009 A | 8/1995 |
| JP | 9-270929 A | 10/1997 |
| JP | 2002-016814 A | 1/2002 |

OTHER PUBLICATIONS

Microsoft word 2000, pp. 1-6.*
Microsoft Windows, Versions5.1, 1998-2001, pp. 1-5*

* cited by examiner

*Primary Examiner*—Kee M. Tung
*Assistant Examiner*—Mike Rahmjoo
(74) *Attorney, Agent, or Firm*—Canon U.S.A. Inc. IP

(57) ABSTRACT

A color image processing apparatus which performs color matching using a plurality of profiles storing printer property information comprises a first selecting portion whereby a user selects four or more matching options and a second selecting portion whereby a user selects an optional profile from the plurality of profiles with attributes other than the matching options. Image processing is then performed using color information corresponding to a combination of results of selections made by the first selecting portion and the second selecting portion, and profile type and three matching options within the profiles.

12 Claims, 17 Drawing Sheets

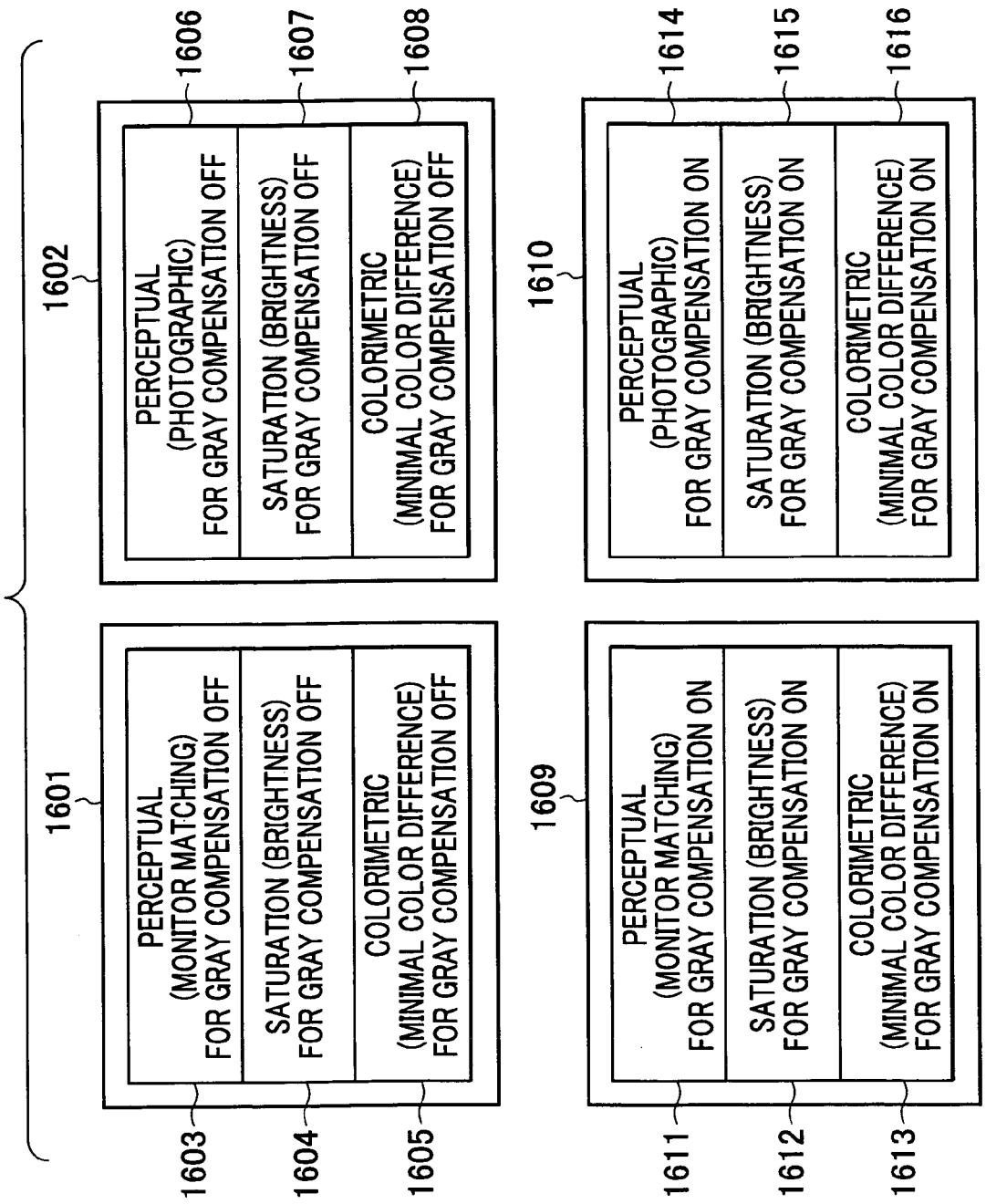

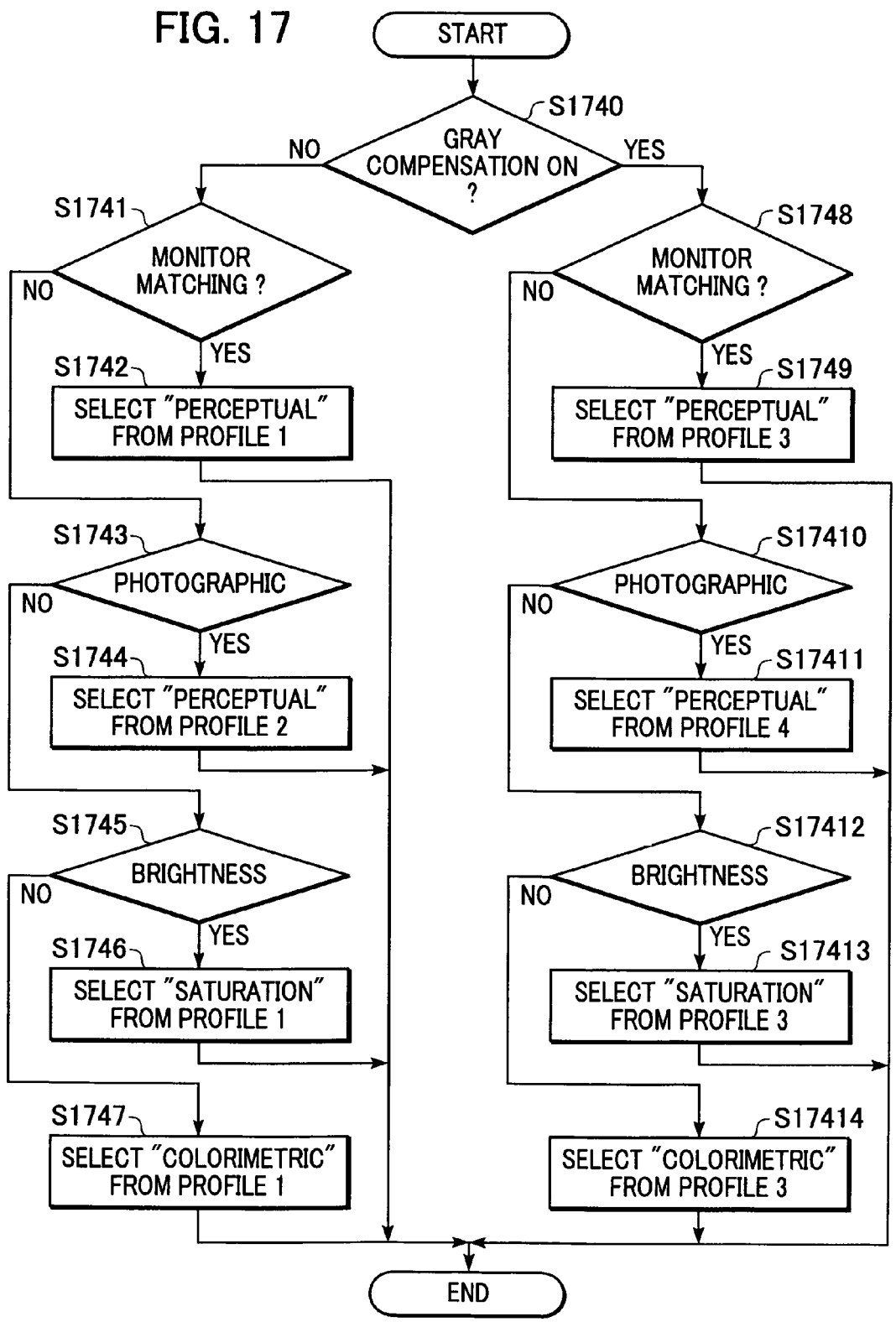

COLOR IMAGE PROCESSING DEVICE, COLOR IMAGE PROCESSING METHOD, RECORDING MEDIUM, AND PROGRAM

BACKGROUND OF THE INVENTION

1. Field of the Invention

The present invention relates to a color image processing apparatus, a color image processing method, a recording medium, and program.

2. Description of the Related Art

With printer systems, color matching between the image displayed on a monitor which a user is using for example, and the printed image obtained by outputting the image, is important. Such color matching is carried out using information called "profiles", which is color information dependent on devices such as printers, monitors, scanners, and so forth. The ICC (International Color Consortium) stipulates the format for profiles, in order to allow color matching to be performed within a unified framework for environments including computer systems and printer systems.

Three types of matching options are stipulated in the ICC format: perceptual, saturation, and colorimetric. The color matching options specify color space compression methods at the time of performing color matching between different color spaces based on the purpose of performing the matching. "Perceptual" is matching with particular weight on the hue, and is particularly used for color matching between monitors and printed images. "Saturation" is matching with weight on saturation, and is used for performing matching while maintaining as high a saturation as possible. "Colorimetric" is used for matching while keeping the color difference as close as possible, and is used for color matching of logos or print samples, for example.

The way in which profiles are used with printer systems is as follows. Several profiles are created beforehand, each with different amounts of toner to be transferred onto the recording medium, for example. An example would be to use a profile calling for large amounts of toner to be transferred in the event of printing photographs or other like images, while using a profile calling for minimum amounts of toner to be transferred for printing shapes or text.

However, with the above-described conventional example, only the three types of matching options, perceptual, saturation, and colorimetric, can be used with each profile created in accordance with the ICC format, and in the event that adding other matching options is desired, the user must select two or more profiles and respective matching options from the user interface of a driver or the like, which is undesirable.

Further, if profiles with different toner amounts are selected, the user needs to further select a profile separate from the above-described matching options.

In FIG. 5, an example of selecting four or more matching operations in a conventional printer driver user interface is shown. FIG. 5 is an example of a user interface window of a driver, from which the user selects profiles and also selects matching options. Reference numeral 52 denotes a portion of the window for selecting the profile to use. The user uses the portion 52 to specify the profile name to use.

Reference numeral 53 denotes a portion of the window for displaying the matching operation currently selected for the profile specified in the portion 52. Reference numeral 54 denotes a pull-down button at the right edge of the display portion 53 in the window, which brings up a pull-down menu with a list of matching options such as denoted by reference numeral 55 upon the user selecting the pull-down button 54 with a pointing device such as a mouse. The user can then select a desired matching operation from the list in the pull-down menu 55. Only three selections are available in the pull-down menu 55, so in the event that more types of matching operations are to be selected, the user needs to combine the profile names and matching operations.

Also, in the event of selecting profiles with different amounts of toner to be transferred, the user needs to specify the profile for the desired amount of toner at the portion 52. The user needs to select profiles for selecting the three or more matching portions, and for obtaining the desired amount of toner. Here, the user is required to perform complicated profile handling which is undesirable.

SUMMARY OF THE INVENTION

The present invention is to solve one or more of the above-described disadvantages, and accordingly, the present invention provides a color image processing apparatus and color image processing method for user-friendly selection of desired color processing.

To this end, according to the present invention, a color image processing apparatus which performs color matching using a plurality of profiles storing printer property information comprises: first selecting means whereby a user selects four or more matching options; second selecting means whereby a user selects an optional profile from the plurality of profiles with attributes other than the matching options; and means for performing image processing using color information corresponding to a combination of results of selections made by the first selecting means and the second selecting means, and profile type and three matching options within the profiles.

According to the present invention as described above, a user interface is provided wherein selecting profiles of which there are actually multiple types is automatically executed internally without selection by the user, while further automatically selecting and processing the data along with information relating to the optional profile, so that it appears that there is one more matching option. In this manner, a user-friendly color image processing device and color image processing method is provided.

Further objects, features and advantages of the present invention will become apparent from the following description of the preferred embodiments with reference to the attached drawings.

BRIEF DESCRIPTION OF THE DRAWINGS

FIG. 16 is a diagram illustrating an example of the internal configuration of an ICC profile according to the fourth embodiment.

FIG. 17 is a flowchart illustrating the flow of profile handling processing according to the fourth embodiment.

DESCRIPTION OF THE PREFERRED EMBODIMENTS

Embodiments of the present invention will now be described in detail, with reference to the attached drawings. Note that while a color laser beam printer (LBP) is used as an example of a printer device, the present invention is by no means restricted to this example, and can be similarly applied to other printer devices, such as color ink-jet printers and the like.

First Embodiment

The printer system according to the present embodiment is a printer system which performs color matching using multiple profiles, which store printer property information. The printer system comprises: selecting means whereby a user selects four or more matching options; means for correlating color information corresponding to the selected matching options and profile type and three matching options within the profiles; means for performing image processing using the color information; means for converting the data following the image processing so as to output from a printer; and means for outputting using the output data. Thus, a color processing system which is user-friendly regarding settings, can be realized.

While the present invention will be described with reference to an example of printer profiles, this can be similarly applied to profiles regarding other devices, such as monitors, scanners, and so forth. The present embodiment will now be described in detail.

Figure 1:
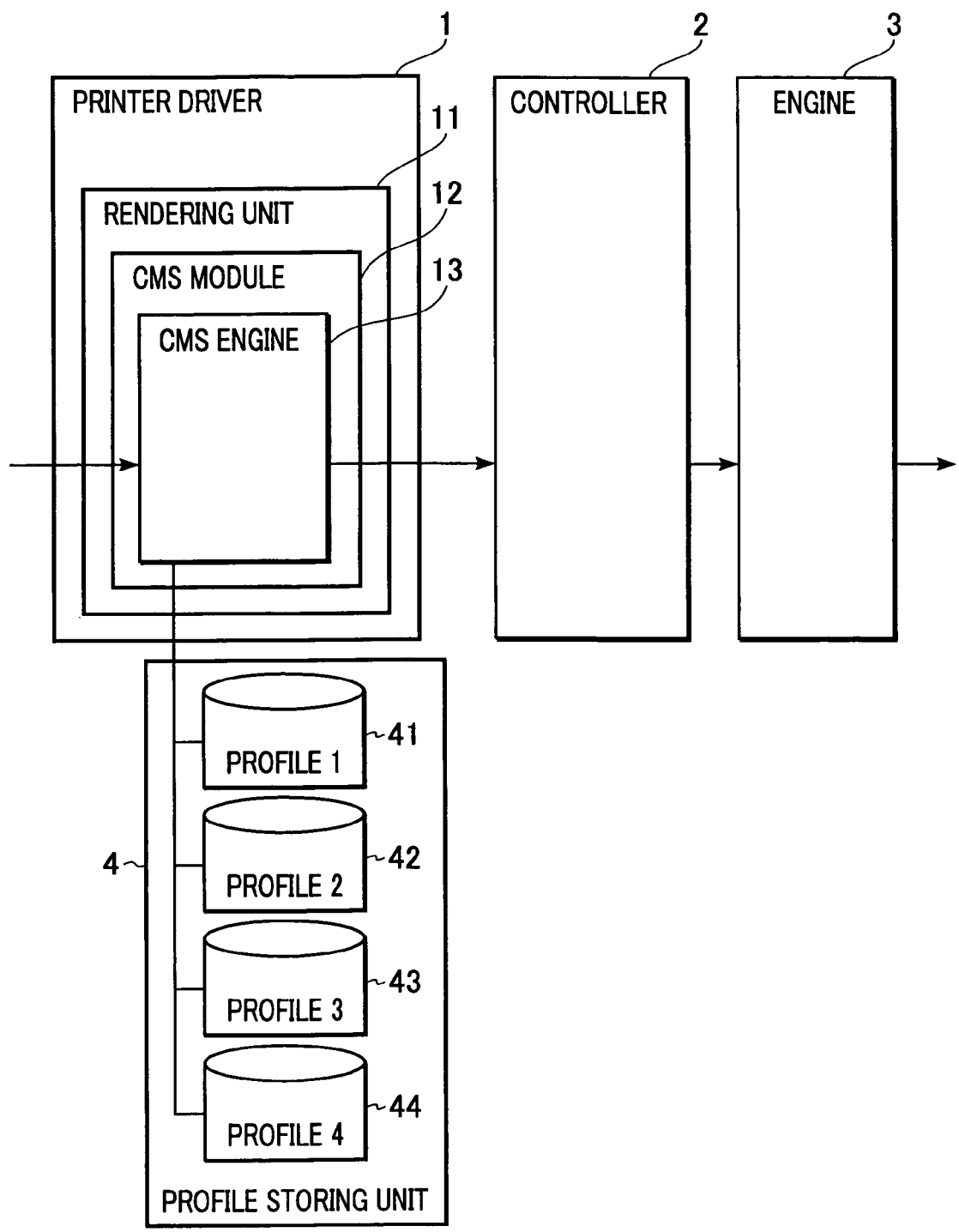
FIG. 1 is a block diagram illustrating a configuration example of a printing system according to a first embodiment.

FIG. 1 is a block diagram illustrating a configuration example of a printing system according to a first embodiment. In FIG. 1, reference numeral 1 denotes a printer driver, and is configured of software for realizing the present system. The printer driver 1 is usually installed on a personal computer of a user, and is used for processing data transmitted from an upper layer such as an application or GDI making up a system or the like, and for ultimately creating data to be sent to the printer. Reference numeral 11 denotes a rendering unit which is part of the printer driver 1, for performing rendering such as logical drawing and so forth.

Reference numeral 12 denotes a CMS (color matching system) module which is within the rendering unit 11, for performing color matching at the time of rendering. Reference numeral 13 denotes a CMS engine which is within the CMS module 12, for performing the actual color matching using later-described profiles.

Reference numeral 2 denotes a controller making up part of the printer, for processing the data transmitted from the driver 1 and creating data to be ultimately sent to the later-described printer engine. Reference numeral 3 denotes a printer engine making up a part of the printer, for processing the data transmitted from the controller 2, and outputting this onto paper. Reference numeral 4 denotes a profile storing unit for storing the later-described multiple profiles for performing color matching with the printer driver 1, normally kept at a specific region in the personal computer of the user. Reference numeral 41 denotes a Profile 1 which is stored in the profile storing unit 4 and is compliant with the ICC format. In the same way, reference numerals 42, 43, and 44 denote Profiles 2, 3, and 4, which are stored in the profile storing unit 4 and are compliant with the ICC format. Note that while four profiles are described as being stored in the profile storing unit 4, there is no particular restriction on the number of profiles stored here.

Figure 3:
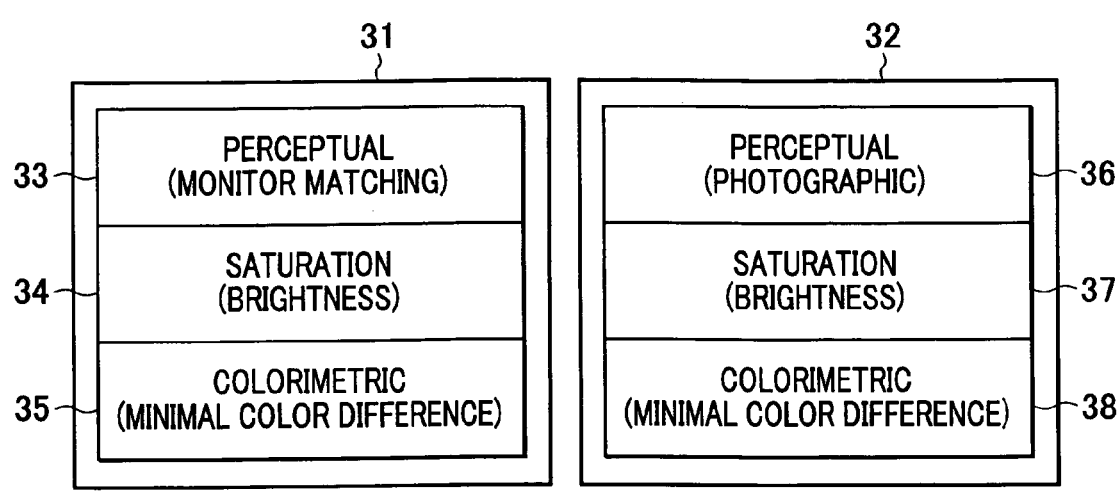
FIG. 3 is a diagram illustrating an example of the internal configuration of an ICC profile according to the first embodiment.

Now, the relation between ICC format profiles and matching options, and color information corresponding to the matching options, will be described with reference to FIG. 3. In FIG. 3, reference numeral 31 denotes the Profile 1 shown in FIG. 1, for example. As mentioned earlier, only three types of matching options can be used for one profile in compliance with the ICC format. These options are: perceptual, saturation, and colorimetric. Each of these is correlated with the color information denoted by reference numerals 33, 34, and 35, respectively. Thus, if the perceptual option is selected with the Profile 31 shown in FIG. 3, color conversion is performed using the stored color information 33. "Color information" as stated here is configured of a LUT (look-up table) such as 3-input-3-output or 3-input-4-output, but details thereof will not be described here. Also, the way in which the corresponding color information is used upon a matching option being selected is based on the configuration stipulated by ICC, and accordingly will not be discussed here.

Further, in FIG. 3, let us say that reference numeral 32 denotes the Profile 2 shown in FIG. 1, for example. Each of the perceptual, saturation, and colorimetric matching options which can be used with the Profile 32 are correlated with the color information denoted by reference numerals 36, 37, and 38, respectively. Thus, both Profile 31 and Profile 32 have configurations wherein three matching options are correlated with their respective color information.

Figure 2:
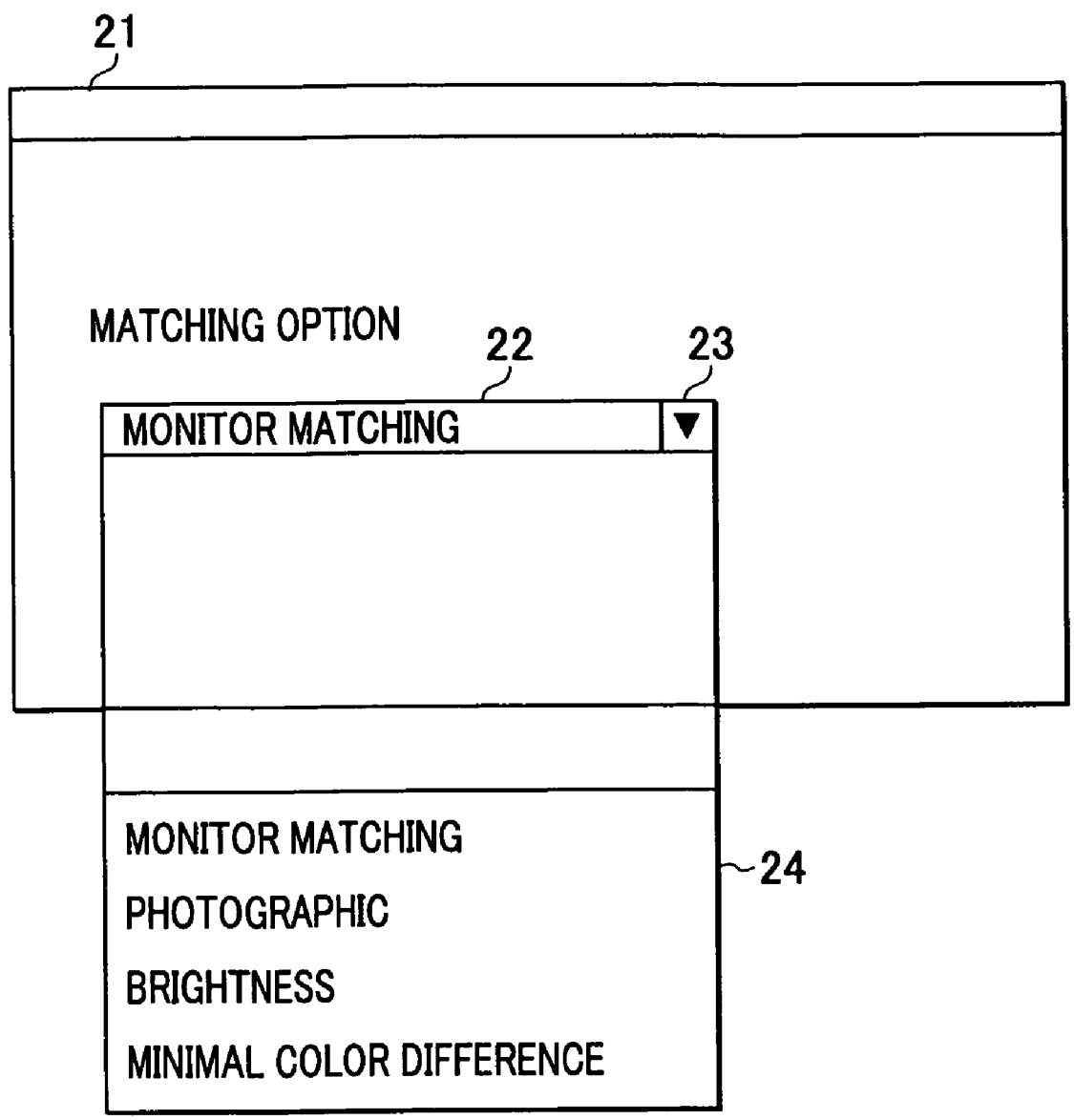
FIG. 2 is a diagram for describing a user interface for selecting matching options in the first embodiment.

Next, an example of selecting matching options with the printer driver user interface will be described with reference to FIG. 2. In FIG. 2, reference numeral 21 represents an example of a driver user interface window, whereby the user selects matching options from the window. Reference numeral 22 denotes a portion in the window for displaying the currently-selected matching option, and reference numeral 23 denotes a pull-down button at the right edge of the display potion 22 in the window. Upon the user selecting the pull-down button 23 with a pointing device such as a mouse, a pull-down menu with a list of matching options, such as that denoted by reference numeral 24, is displayed. The user selects a desired matching option from the list in the pull-down menu 24.

While the selections in the pull-down menu 24 are normally three, the present embodiment allows this to be four or more. That is to say, color matching processing can be realized using color information stored in separate profiles, by selecting from the pull-down menu 24.

Figure 4:
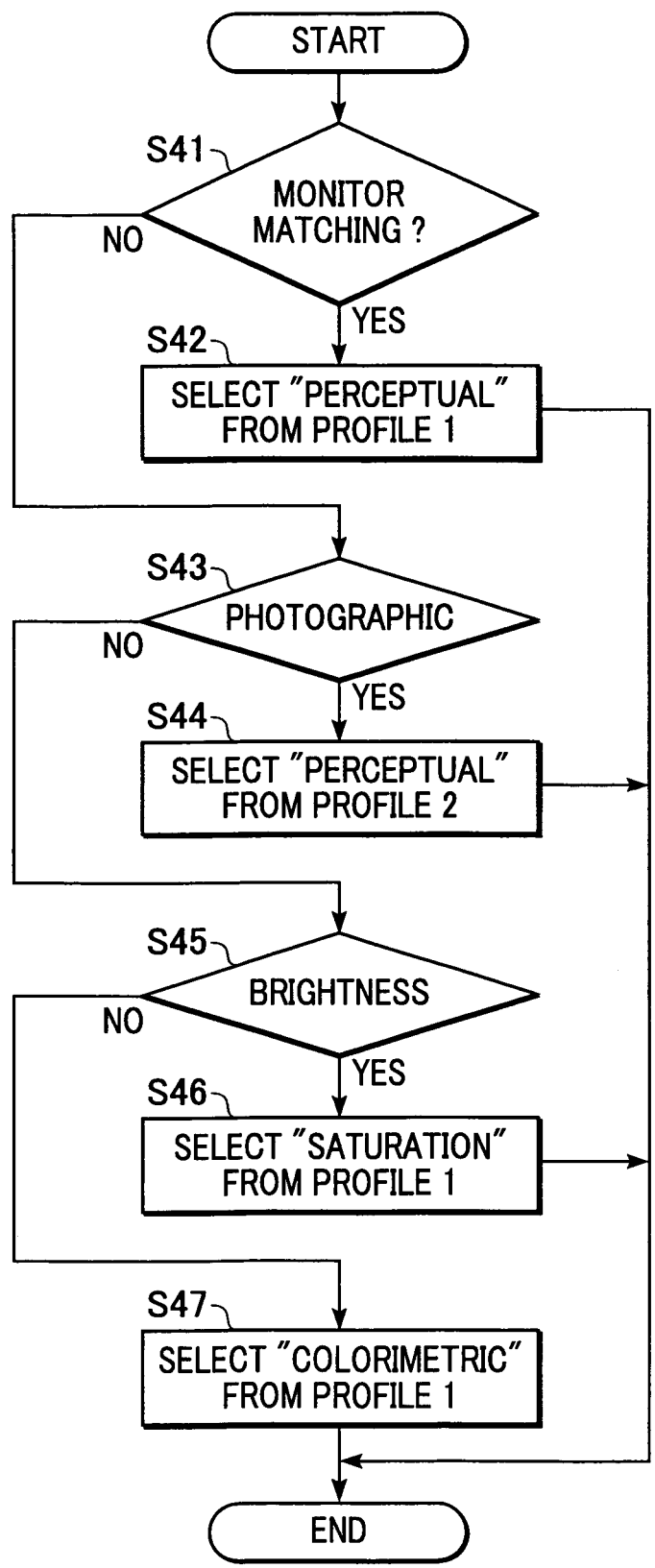
FIG. 4 is a flowchart illustrating the flow of profile handling processing according to the first embodiment.
Figure 5:
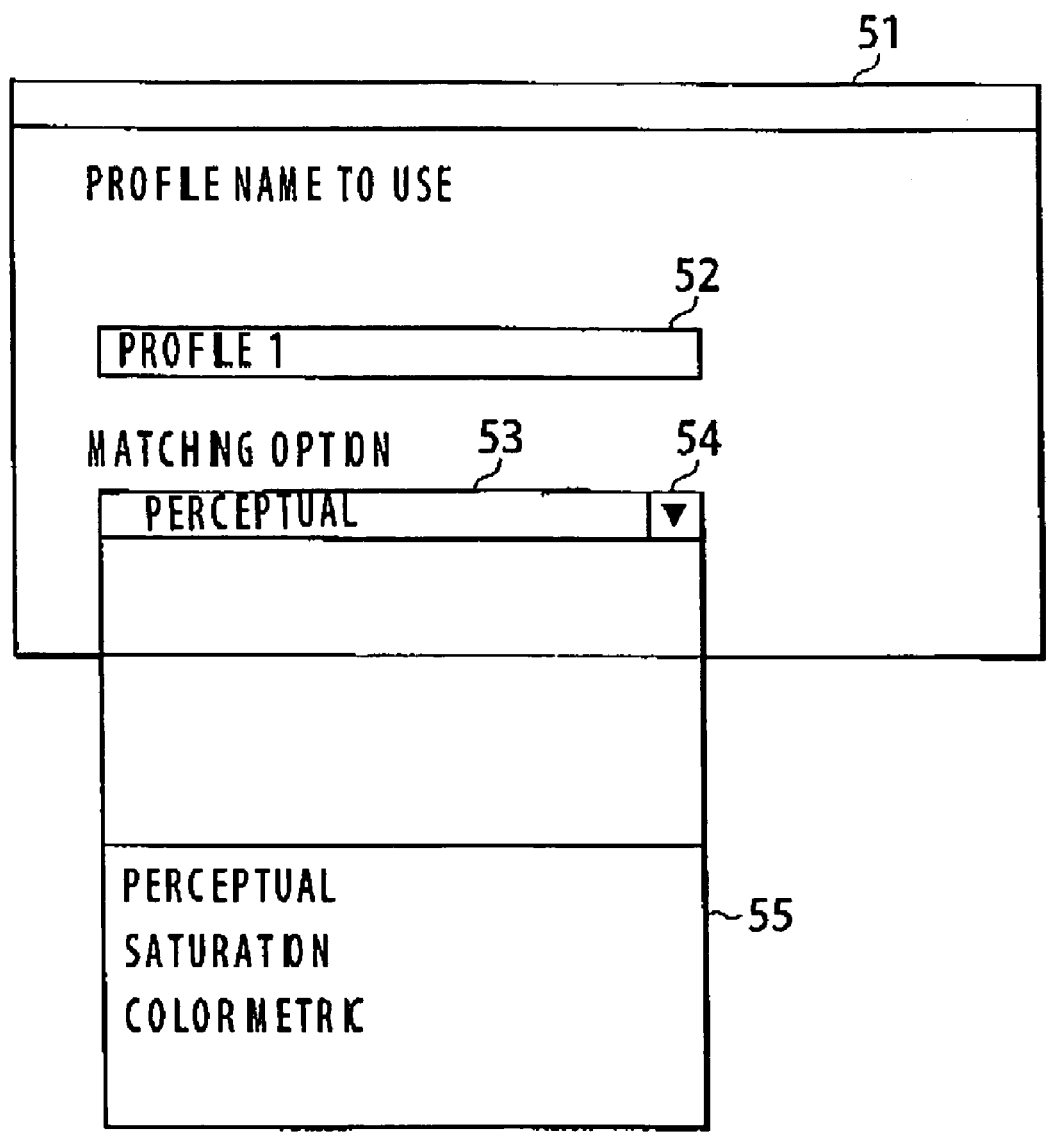
FIG. 5 is a diagram for describing a conventional user interface for performing matching option selection.

The flow for profile handling processing for four or more types of matching options will be described with reference to the flowchart in FIG. 4. Here, in step S41, whether the matching option displayed in the display portion 22 in FIG. 2, i.e., the matching option currently selected by the user, is monitor matching or not, is determined first. In the event that monitor matching is selected, "perceptual" in Profile 1 is selected in step S42, and the flow ends. Accordingly, the CMS engine 13 shown in FIG. 1 uses the perceptual 33 which is color conversion information within Profile 1, indicated by reference numeral 31 in FIG. 2, for subsequent data processing.

In the event that the matching option currently selected by the user is not monitor matching in step S41, next, in step S43, whether or not the matching option currently selected by the user is "photographic" is determined. In the event that "photographic" is selected, the color conversion information for "perceptual" in Profile 2 is selected in step S44, and the flow ends. Accordingly, the CMS engine 13 shown in FIG. 1 uses the perceptual 36 which is color conversion information within Profile 2, indicated by reference numeral 32 in FIG. 2, for subsequent data processing.

In the event that the matching option currently selected by the user is not photographic in step S43, next, in step S45, whether or not the matching option currently selected by the user is "saturation" is determined. In the event that "saturation" is selected, the color conversion information for "saturation" in Profile 1 is selected in step S46, and the flow ends. Accordingly, the CMS engine 13 shown in FIG. 1 uses the saturation 34 which is color conversion information within Profile 1, indicated by reference numeral 31 in FIG. 2, for subsequent data processing.

Now, the present embodiment is described with an example of four matching options, so the saturation color conversion information 34 and 37 within the Profile 1 and Profile 2 in FIG. 3 are the same. Accordingly, the saturation color conversion information in Profile 2 can be used in step S46. Also, handling five or more matching options can be dealt with by making the color conversion information 37 to be different from that of 34. This also holds true for the later-described colorimetric color conversion information 35 and 38.

In the event that the matching option currently selected by the user in step S45 is not "saturation", next, in step S47, the color conversion information for "colorimetric" in Profile 1 is selected, and the flow ends. Accordingly, the CMS engine 13 shown in FIG. 1 uses the colorimetric 35 which is color conversion information within Profile 1, indicated by reference numeral 31 in FIG. 2, for subsequent data processing.

According to the present embodiment as described above, with a printer system which performs color matching using multiple ICC-format-compliant profiles, a user selects from among four or more matching options, whereby correlating is performed for color information corresponding to the selected matching options and profile type and three matching options within the profiles, thereby automatically selecting profiles of which there are actually multiple types for performing image processing using the color information but without involving intentional selection thereby being carried out by the user. Thus, a user-friendly color processing system can be obtained.

Second Embodiment

The printer system according to the present embodiment is a color image processing device which performs color matching using a plurality of profiles storing printer property information and comprises: first selecting means whereby a user selects four or more matching options; second selecting means whereby a user selects an optional profile from the plurality of profiles with attributes other than the matching options; means for correlating color information corresponding to a combination of results of selections made by the first selecting means and the second selecting means, and profile type and three matching options within the profiles; means for performing image processing using color information; means for performing image processing using the color information; means for converting the data following the image processing so as to output from a printer; and means for outputting using the output data. Thus, a color processing system which is user-friendly regarding settings, can be realized.

Figure 6:
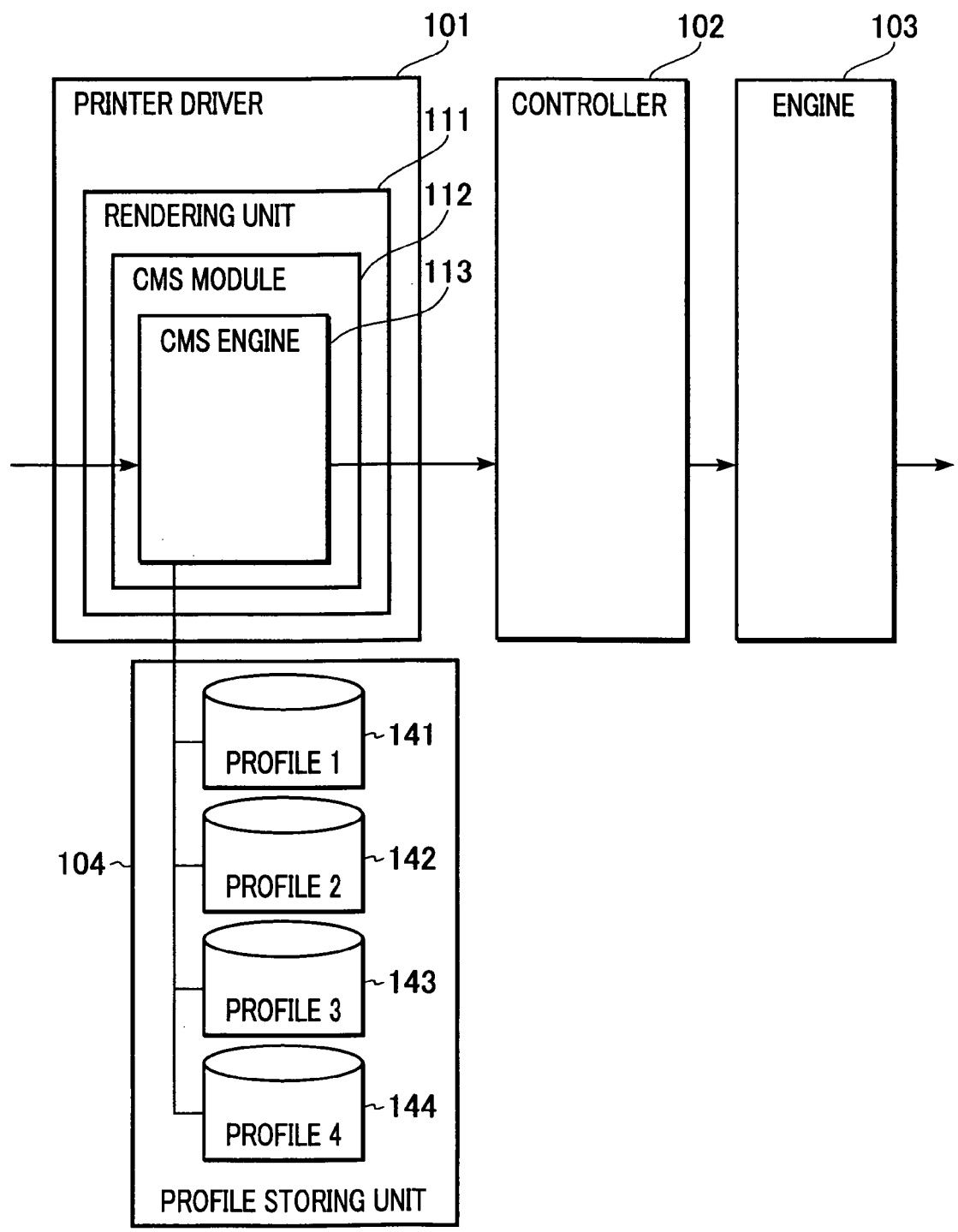
FIG. 6 is a block diagram illustrating a configuration example of a printing system according to a second embodiment.

The present embodiment will now be described in detail. FIG. 6 is a block diagram illustrating a configuration example of a printing system according to a second embodiment of the present invention. In FIG. 6, reference numeral 101 denotes a printer driver, and is configured of software for realizing the present system. The printer driver 101 is usually installed on a personal computer of a user, and is used for processing data transmitted from an upper layer such as an application or GDI making up a system or the like, though not shown in the drawings, and for ultimately creating data to be sent to the printer. Reference numeral 111 denotes a rendering unit which is part of the printer driver 101, for performing rendering such as logical drawing and so forth. Reference numeral 112 denotes a CMS module which is within the rendering unit 111, for performing color matching at the time of rendering. Reference numeral 113 denotes a CMS engine which is within the CMS module 112, for performing the actual color matching using later-described profiles.

Reference numeral 102 denotes a controller making up part of the printer, for processing the data transmitted from the driver 101 and creating data to be ultimately sent to the later-described printer engine. Reference numeral 103 denotes a printer engine making up a part of the printer, for processing the data transmitted from the controller 102, and outputting this onto paper. Reference numeral 104 denotes a profile storing unit for storing the later-described multiple profiles for performing color matching with the printer driver 101, normally kept at a specific region in the personal computer of the user. Reference numeral 141 denotes a Profile 1 which is stored in the profile storing unit 104 and is compliant with the ICC format. In the same way, reference numerals 142, 143, and 144 denote Profiles 2, 3, and 4, which are stored in the profile storing unit 104 and are compliant with the ICC format.

Note that in the present embodiment, the Profiles 1 and 2 indicated by the reference numerals 141 and 142 are profile types wherein a significant amount of toner is transferred, while the Profiles 3 and 4 indicated by the reference numerals 143 and 144 are profile types wherein a small amount of toner is transferred. Note that the terms "significant" or "large" amounts of toner indicate that at least more toner is transferred relative to other profiles.

Now, the relation between ICC format profiles and matching options, and color information corresponding to the matching options, will be described with reference to FIG. 8.

Figure 8:
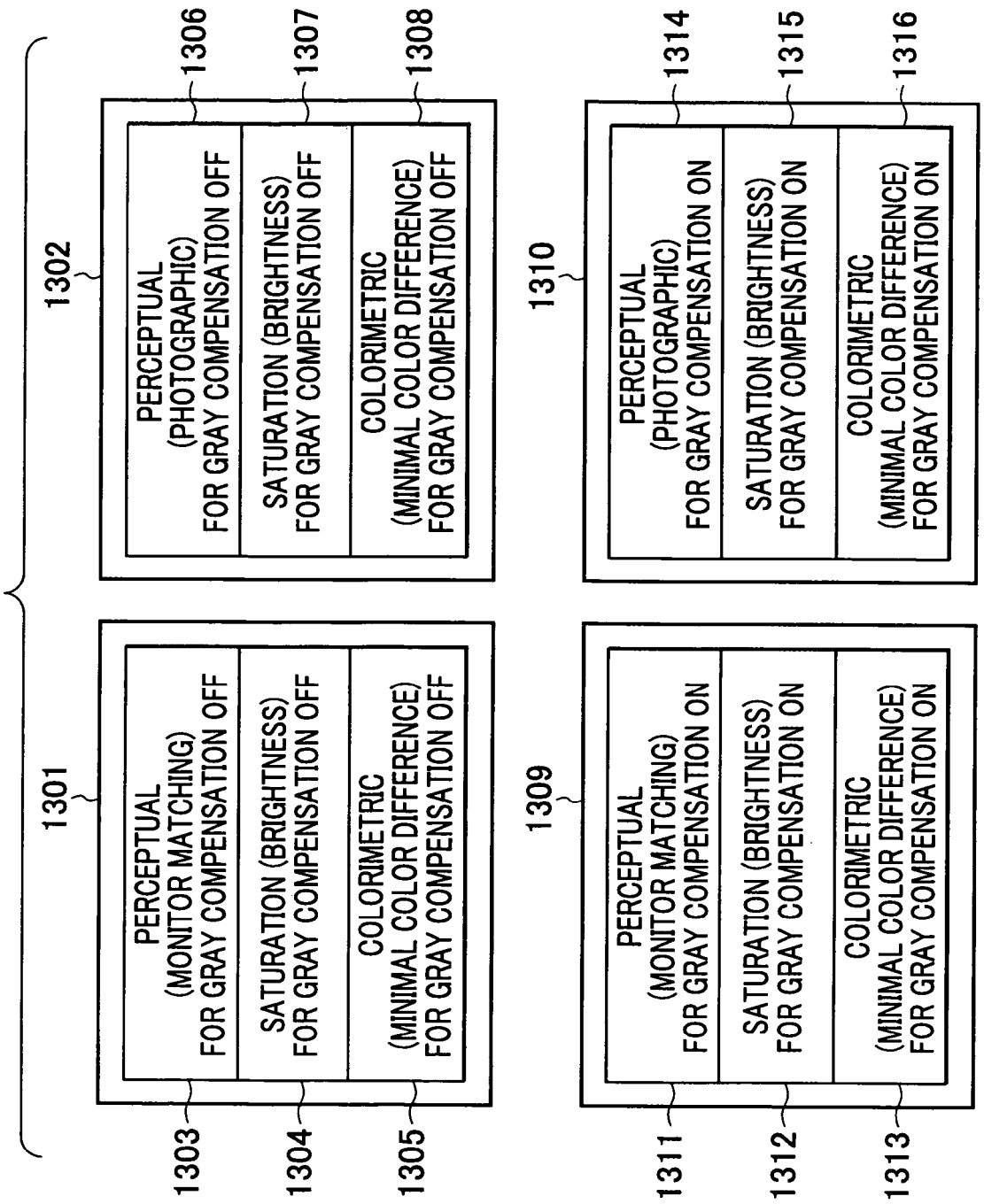
FIG. 8 is a diagram illustrating an example of the internal configuration of an ICC profile according to the second embodiment.

In FIG. 8, let reference numeral 1301 denote the Profile 1 shown in FIG. 6, for example. As mentioned earlier, only three types of matching options can be used for one profile created compliant with the ICC format: perceptual, saturation, and colorimetric. Each of these is correlated with the color information denoted by reference numerals 1303, 1304, and 1305, respectively. That is to say, in the event that the perceptual option is selected with the Profile 1301 shown in FIG. 8, color conversion is performed using the stored color information 1303. "Color information" as stated here is configured of a LUT (look-up table) such as 3-input-4-output, but details thereof will not be described here. Also, the way in which the corresponding color information is used upon a matching option being selected is based on the configuration stipulated by ICC, and accordingly will not be discussed here.

Further, in FIG. 8, let reference numeral 1302 denote the Profile 2 shown in FIG. 6, for example. Each of the perceptual, saturation, and colorimetric matching options which can be used with the Profile 1302 are correlated with the color information denoted by reference numerals 1306, 1307, and 1308, respectively. Thus, both Profile 1301 and Profile 1302 have configurations wherein three matching options are correlated with their respective color information.

Profile 1301 and Profile 1302 are created as profile types wherein the amount of toner to be transferred is large. While the following description will proceed using the example of the amount of toner, it is needless to say that with an arrangement wherein the printer engine 103 is an ink-jet printer, Profile 1301 and Profile 1302 would be profile types wherein a significant amount of ink is discharged.

Reference numerals 1309 and 1310 denote Profiles 3 and 4 in FIG. 6. The internal configuration is the same as the Profiles 1301 and 1302, but created as profile types wherein the amount of toner to be transferred is small at the time of performing image formation corresponding to images with the printer engine 103. It is needless to say that with an arrangement wherein the printer engine 103 is an ink-jet printer, Profile 1309 and Profile 1310 would be profile types wherein a small amount of ink is discharged, so both profiles which use significant amounts of coloring material and profiles which use small amounts thereof are included in the present embodiment.

With profile types wherein the amount of toner to be transferred is significant, in the event that the input signals are RGB signals and gray data wherein the value of R (red), G (green), and B (blue) is the same, is to be processed, this gray data is ultimately realized by mixing C (cyan), M (magenta), Y (yellow), and K (black). In comparison with this, with profile types wherein the amount of toner to be transferred is small, in the event that the input signals are RGB signals and gray data wherein the value of R, G, and B, is the same, is to be processed, this gray data is realized by K alone. The difference between these two types of profiles may be manifested not only in the difference between gray processing, but also in maximal value restrictions in CMYK distribution obtained by processing secondary color input values such as R, G, and B, for example, or as maximal value restrictions in CMYK distribution obtained by processing other mixed color data.

Figure 7:
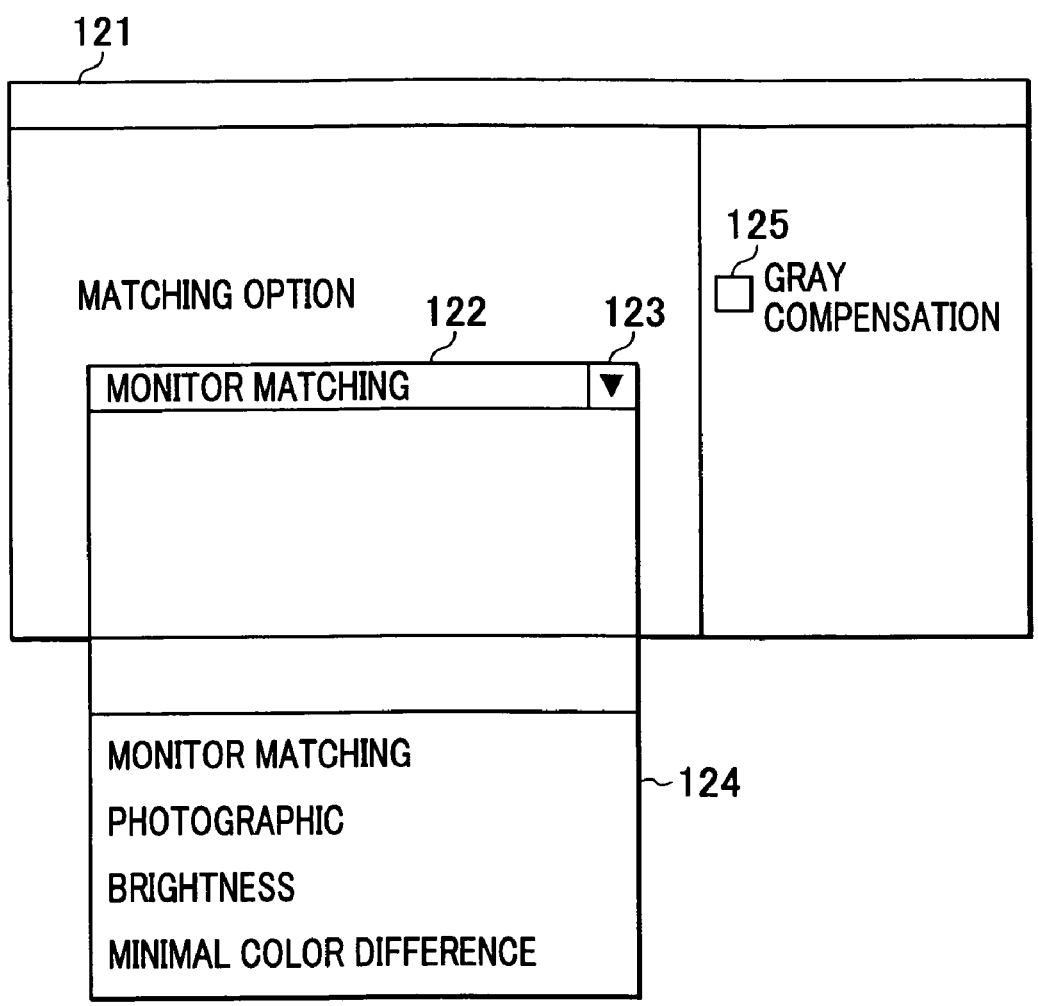
FIG. 7 is a diagram for describing a user interface for selecting matching options in the second embodiment.

Next, an example of selecting matching options with the printer driver user interface will be described with reference to FIG. 7. In FIG. 7, reference numeral 121 represents an example of a driver user interface window, whereby the user selects matching options from the window. Reference numeral 122 denotes a portion in the window for displaying the currently-selected matching option, and reference numeral 123 denotes a pull-down button at the right edge of the display potion 122 in the window. Upon the user selecting the pull-down button 123 with a pointing device such as a mouse, a pull-down menu with a list of matching options, such as that denoted by reference numeral 124, is displayed. The user selects a desired matching option from the list in the pull-down menu 124.

While the selections in the pull-down menu 124 are normally three, the present embodiment allows this to be four or more. That is to say, color matching processing can be realized using color information stored in separate profiles, by selecting from the pull-down menu 124.

Reference numeral 125 denotes a checkbox in the window 121 for selecting a toner transfer amount type with attributes other than the matching options, wherein checking this box means selecting a type with a small amount of toner transferred, and unchecking this box means selecting a type with a significant amount of toner transferred. Further, as yet another attribute, a profile may be selected wherein the user has changed (customized) the amount of inking-in of the profiles 1301 and 1302 (the ratio for substituting YMC with K). In this case, a checkbox for selecting the customized profile is displayed on the window 121. Due to this configuration, the user can select matching options (color information) from profiles having the ink-in reproduction which the user desires, as the later-described four or more types of matching options.

Figure 9:
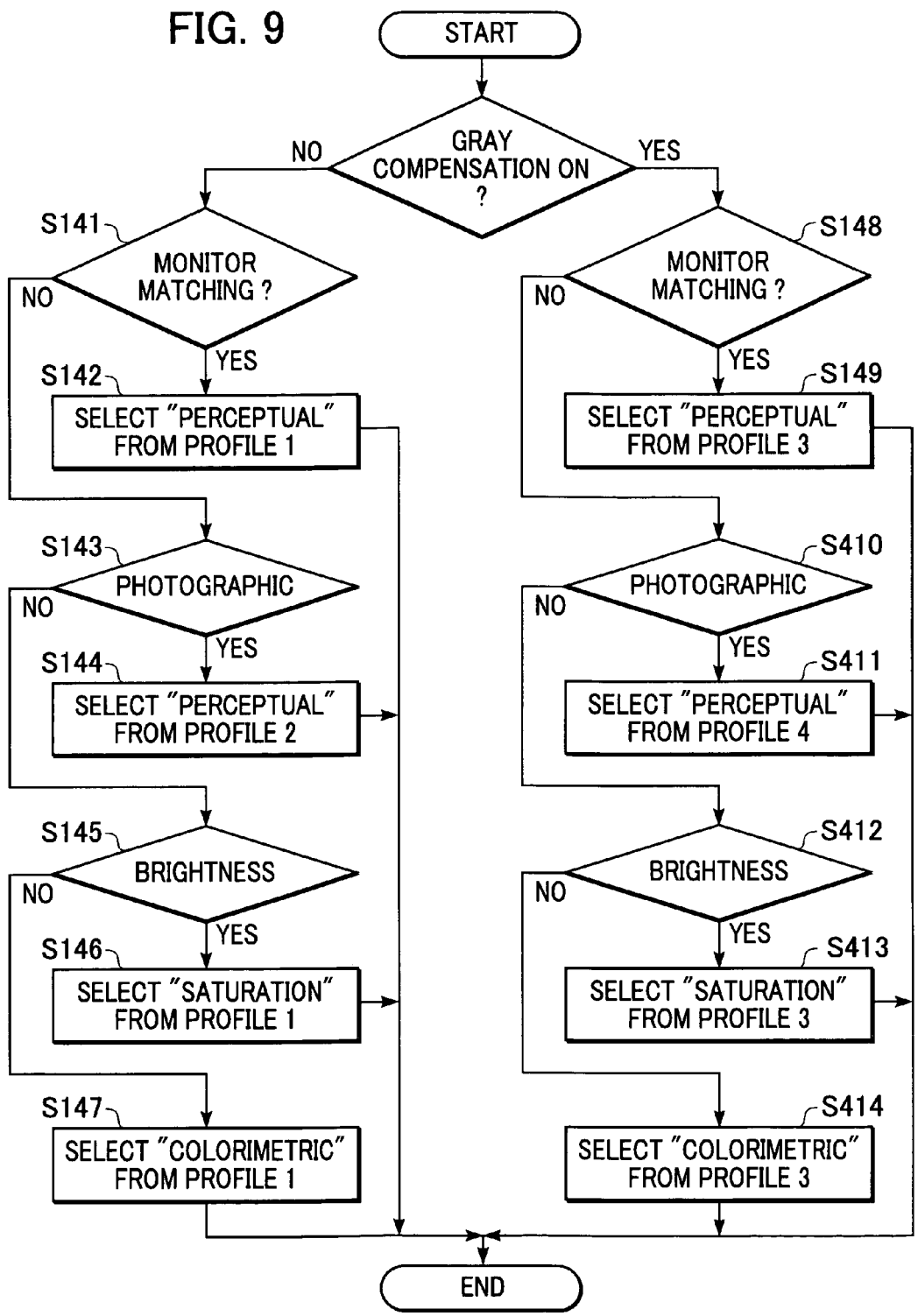
FIG. 9 is a flowchart illustrating the flow of profile handling processing according to the second embodiment.

The flow for profile handling processing at the time of dealing with four or more types of matching options will be described with reference to the flowchart in FIG. 9. First, in step S140, whether or not the profile type is that with a significant amount of toner or a small amount of toner is determined by whether or not the checkbox 125 shown in FIG. 7 has been checked.

In the event that this is a type with a small amount of toner, next, in step S141, whether the matching option displayed in the display portion 122 in FIG. 7, i.e., the matching option currently selected by the user, is monitor matching or not, is determined first. In the event that monitor matching is selected, "perceptual" in Profile 1 is selected in step S142, and the flow ends. Accordingly, the CMS engine 113 shown in FIG. 6 uses the perceptual 1303 which is color conversion information within Profile 1, indicated by reference numeral 1301 in FIG. 8, for subsequent data processing.

In the event that the matching option currently selected by the user is not monitor matching in step S141, next, in step S143, whether or not the matching option currently selected by the user is "photographic" is determined. In the event that "photographic" is selected, the color conversion information for "perceptual" in Profile 2 is selected in step S144, and the flow ends. Accordingly, the CMS engine 113 shown in FIG. 6 uses the perceptual 1306 which is color conversion information within Profile 2, indicated by reference numeral 1302 in FIG. 8, for subsequent data processing.

In the event that the matching option currently selected by the user is not photographic in step S143, next, in step S145, whether or not the matching option currently selected by the user is "saturation" is determined. In the event that "saturation" is selected, the color conversion information for "saturation" in Profile 1 is selected in step S146, and the flow ends. Accordingly, the CMS engine 113 shown in FIG. 6 uses the saturation 1304 which is color conversion information within Profile 1, indicated by reference numeral 1301 in FIG. 8, for subsequent data processing.

The present embodiment is described with an example of four matching options, so the saturation color conversion information 1304 and 1307 within the Profile 1 denoted in FIG. 8 with reference numeral 1301 and the Profile 2 denoted with reference numeral 1302 are the same. Accordingly, the saturation color conversion information in Profile 2 can be used in step S146. Also, handling five or more matching options can be dealt with by making the color conversion information 1307 to be different from that of 1304. This also holds true for the later-described colorimetric color conversion information 1305 and 1308.

In the event that the matching option currently selected by the user in step S145 is not "saturation", next, in step S147, the color conversion information for "colorimetric" in Profile 1 is selected, and the flow ends. Accordingly, the CMS engine 113 shown in FIG. 6 uses the colorimetric 1305 which is color conversion information within Profile 1, indicated by reference numeral 1301 in FIG. 8, for subsequent data processing.

In the event that the checkbox 125 is checked in step S140, meaning that the profile is a type with a significant amount of toner, next, in step S148, whether the matching option displayed in the display portion 122 in FIG. 7, i.e., the matching option currently selected by the user, is monitor matching or not, is determined first. In the event that monitor matching is selected, "perceptual" in Profile 3 is selected in step S149, and the flow ends. Accordingly, the CMS engine 113 shown in FIG. 6 uses the perceptual 1311 which is color conversion information within Profile 3, indicated by reference numeral 1309 in FIG. 8, for subsequent data processing.

In the event that the matching option currently selected by the user is not monitor matching in step S148, next, in step S410, whether or not the matching option currently selected by the user is "photographic" is determined. In the event that "photographic" is selected, the color conversion information for "perceptual" in Profile 4 is selected in step S411, and the flow ends. Accordingly, the CMS engine 113 shown in FIG. 6 uses the perceptual 1314 which is color conversion information within Profile 4, indicated by reference numeral 1310 in FIG. 8, for subsequent data processing.

In the event that the matching option currently selected by the user is not photographic in step S410, next, in step S412, whether or not the matching option currently selected by the user is "saturation" is determined. In the event that "saturation" is selected, the color conversion information for "saturation" in Profile 3 is selected in step S413, and the flow ends. Accordingly, the CMS engine 113 shown in FIG. 6 uses the saturation 1312 which is color conversion information within Profile 3, indicated by reference numeral 1309 in FIG. 8, for subsequent data processing. Thus, in step S413, the saturation color conversion information 1315 of Profile 4 may be used as instead. This also holds true for the later-described colorimetric color conversion information 1313 and 1316.

In the event that the matching option currently selected by the user in step S412 is not "saturation", next, in step S414, the color conversion information for "colorimetric" in Profile 3 is selected, and the flow ends. Accordingly, the CMS engine 113 shown in FIG. 6 uses the colorimetric 1313 which is color conversion information within Profile 3, indicated by reference numeral 1313 in FIG. 8, for subsequent data processing.

According to the present embodiment as described above, a printer system which performs color matching using multiple ICC compliant profiles, a user selects four or more matching options and selects an optional profile from the plurality of profiles with attributes other than the matching options. Correlation is performed for color information corresponding to the combination of selection results, and profile type and three matching options within the profiles, and image processing is performed using the color information, thereby automatically selecting profiles of which there are actually multiple types for performing image processing using the color information but without involving user selection. Thus, a user-friendly color processing system can be obtained.

Third Embodiment

Figure 10:
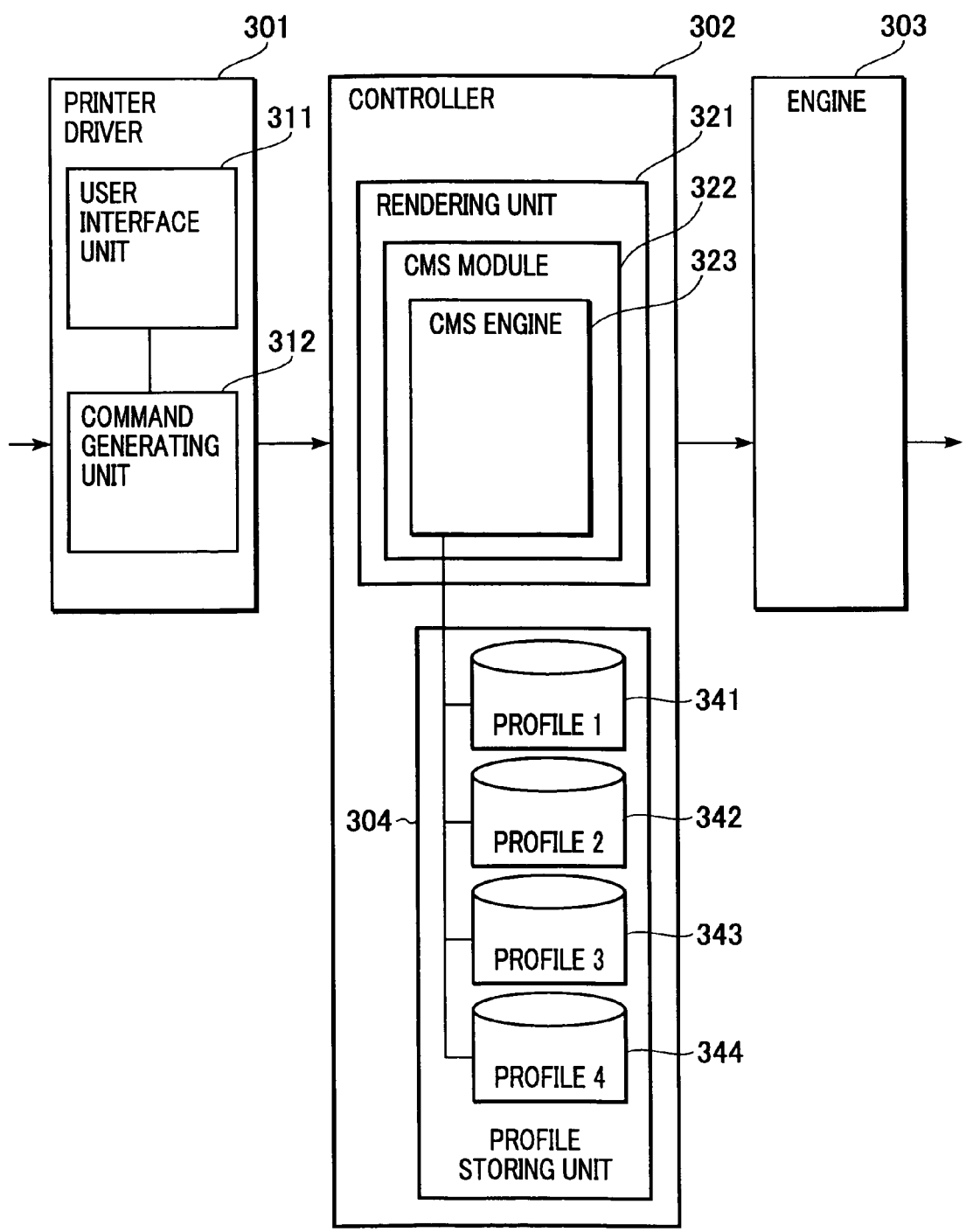
FIG. 10 is a block diagram illustrating a configuration example of a printing system according to a third embodiment.

Next, a third embodiment of the present invention will be described. FIG. 10 is a block diagram illustrating a configuration example of a printing system according to the third embodiment. In FIG. 10, reference numeral 301 denotes a printer driver, and is configured of software for realizing the present system. The printer driver 301 is usually installed on a personal computer of a user, and is used for processing data transmitted from an upper layer such as an application or GDI making up a system or the like, though not shown in the drawings, and for ultimately creating data to be sent to the printer. Reference numeral 311 denotes a user interface unit which is part of the printer driver 301, for performing various settings by the user. Reference numeral 312 denotes a command generating unit which is within the printer driver 301, having a configuration for generating various commands to be sent to a later-described controller based on the settings made at the user interface unit 311, including data to be sent to the printer.

Reference numeral 302 denotes a controller making up part of the printer, for processing data including various types of commands, generated by the commend generating unit 312 within the driver 301 and transmitted thereby, and creating data to be ultimately sent to the later-described printer engine. The rendering unit 312 is part of the controller 302, for performing rendering such as logical drawing and so forth. The CMS module 322 is within the rendering unit 312, for performing color matching at the time of rendering. The CMS engine 323 is within the CMS module 322, for performing the actual color matching using later-described profiles. The printer engine 303 makes up a part of the printer, for processing the data transmitted from the controller 302, and outputting this onto paper. Reference numeral 304 denotes a profile storing unit which is part of the controller 302, for storing the later-described multiple profiles for performing color matching with the controller 302, normally kept at a specific region in the controller 302.

Reference numeral 341 denotes a Profile 1 which is stored in the profile storing unit 304 and is compliant with the ICC format. In the same way, reference numerals 342, 343, and 344 denote Profiles 2, 3, and 4, which are stored in the profile storing unit 304 and are compliant with the ICC format. Note that while four profiles are described as being stored in the profile storing unit 304, there is no particular restriction on the number of profiles stored here. Also, the profiles stored in the profile storing unit 304 may be installed at the plant before shipping, or may be downloaded from the personal computer of the user, using an application such as a profile downloader.

Figure 12:
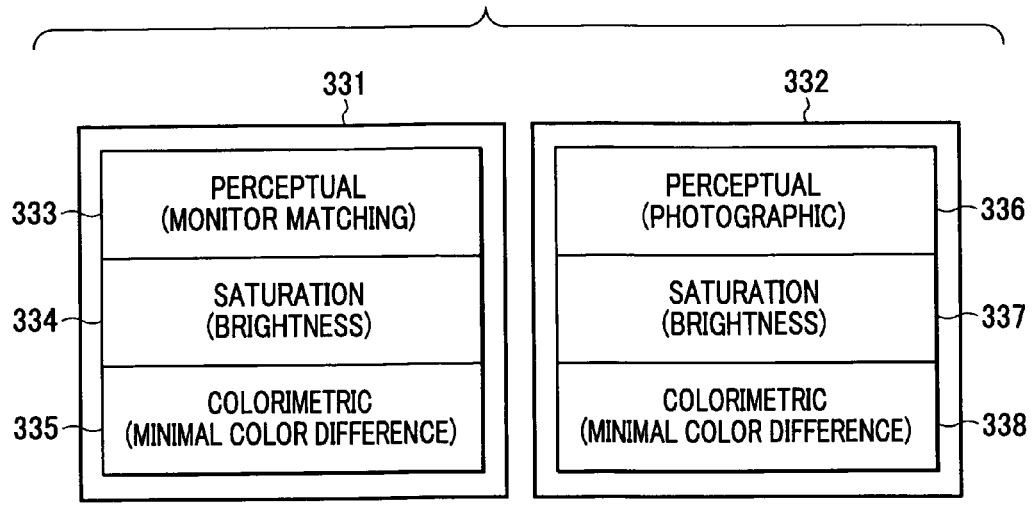
FIG. 12 is a diagram illustrating an example of the internal configuration of an ICC profile according to the third embodiment.

Now, the relation between ICC format profiles and matching options, and color information corresponding to the matching options, will be described with reference to FIG. 12. In FIG. 12, let reference numeral 331 denote the Profile 1 shown in FIG. 10, for example. As mentioned earlier, only three types of matching options can be used for one profile created compliant with the ICC format; perceptual, saturation, and colorimetric. Each of these are correlated with the color information denoted by reference numerals 333, 334, and 335, respectively. That is to say, in the event that the perceptual option is selected with the Profile 331 shown in FIG. 12, color conversion is performed using the stored color information 333. "Color information" as stated here is configured of a LUT (look-up table) such as 3-input-3-output or 3-input-4-output, but details thereof will not be described here. Also, the way in which the corresponding color information is used upon a matching option being selected is based on the configuration stipulated by ICC, and accordingly will not be discussed here.

Further, in FIG. 12, let us say that reference numeral 332 denotes the Profile 2 shown in FIG. 10, for example. Each of the perceptual, saturation, and colorimetric matching options which can be used with the Profile 332 are correlated with the color information denoted by reference numerals 336, 337, and 338, respectively. Thus, both Profile 331 and Profile 332 have configurations wherein three matching options are correlated with their respective color information.

Figure 11:
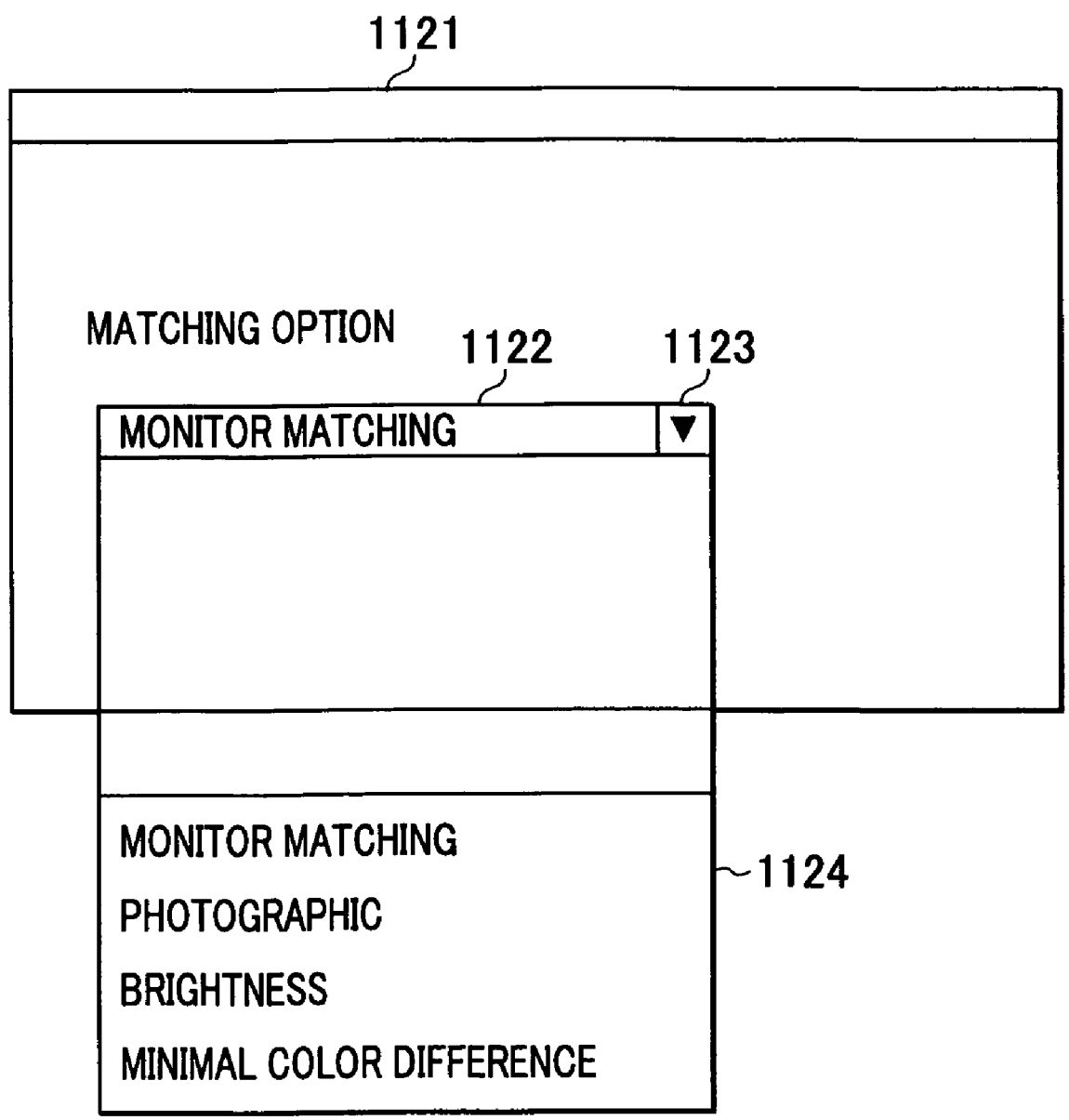
FIG. 11 is a diagram for describing a user interface for selecting matching options in the third embodiment.

Next, an example of selecting matching options with the printer driver user interface 311 will be described with reference to FIG. 11. In FIG. 11, reference numeral 1121 represents an example of a driver user interface window, whereby the user selects matching options from the window. Reference numeral 1122 denotes a portion in the window for displaying the currently-selected matching option, and reference numeral 1123 denotes a pull-down button at the right edge of the display potion 1122 in the window. Upon the user selecting the pull-down button 1123 with a pointing device such as a mouse, a pull-down menu with a list of matching options, such as that denoted by reference numeral 1124, is displayed. The user selects a desired matching option from the list in the pull-down menu 1124.

While the selections in the pull-down menu 1124 are normally three, the present embodiment allows this to be four or more. That is to say, color matching processing can be realized using color information stored in separate profiles, by selecting from the pull-down menu 1124.

Upon the matching options being selected with the user interface unit 311, the command generating unit 312 generates a selection command for selecting the matching options within the controller 302 according to the selection, which is sent to the controller 302 at an optional timing.

Figure 13:
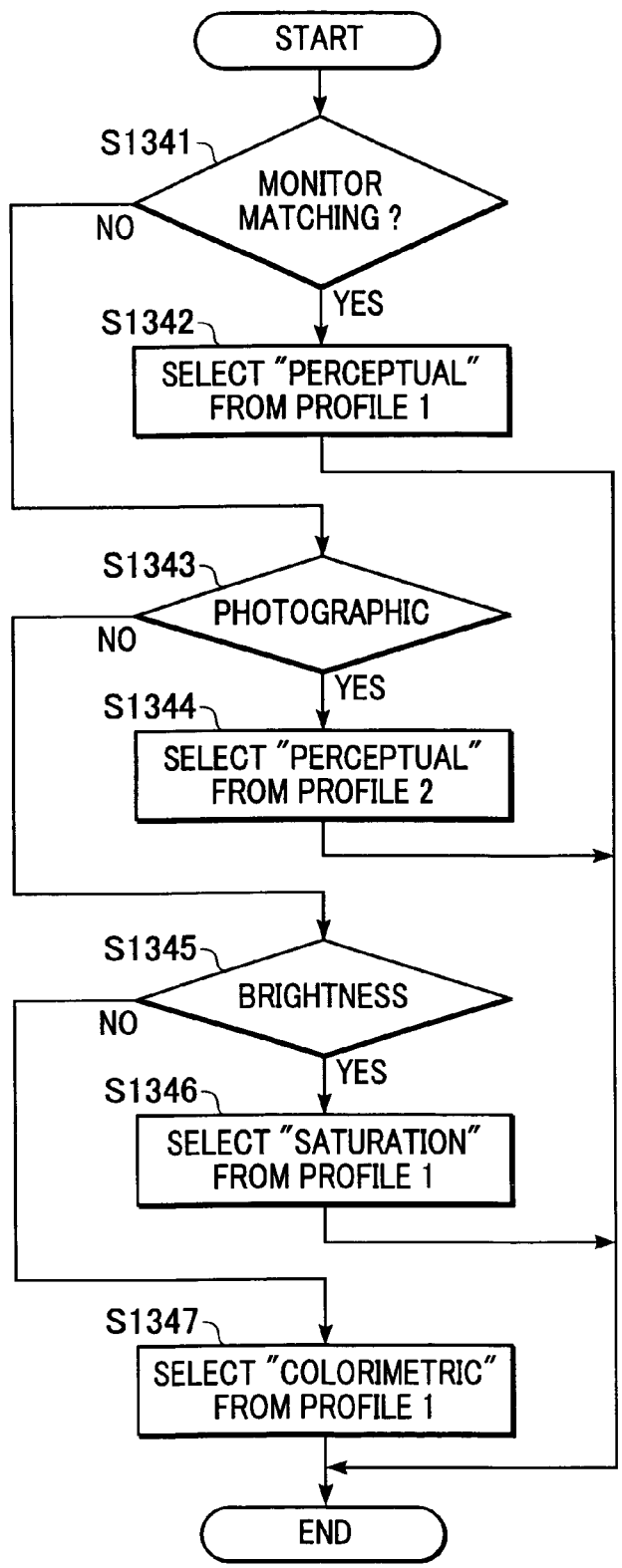
FIG. 13 is a flowchart illustrating the flow of profile handling processing according to the third embodiment.

The flow for profile handling processing at the time of dealing with four or more types of matching options within the controller 302 will be described with reference to the flowchart in FIG. 13. Here, in step S1341, whether the selection command which is created at the command creating unit 312 and transmitted according to the matching option displayed in the display portion 1122 in FIG. 11, i.e., the matching option currently selected by the user, is monitor matching or not, is determined first. In the event that monitor matching is selected, "perceptual" in Profile 1 is selected in step S1342, and the flow ends. Accordingly, the CMS engine 323 shown in FIG. 10 uses the perceptual 1333 which is color conversion information within Profile 331 in FIG. 12, for subsequent data processing.

In the event that the selection command generated according to the matching option currently selected by the user is not monitor matching in step S1341, next, in step S1343, whether or not the selection command generating according to the matching option currently selected by the user is "photographic" is determined. In the event that "photographic" is selected, the color conversion information for "perceptual" in Profile 332 is selected in step S1344, and the flow ends. Accordingly, the CMS engine 323 shown in FIG. 10 uses the perceptual 1336 which is color conversion information within Profile 332 in FIG. 12, for subsequent data processing.

In the event that the selection command generated according to the matching option currently selected by the user is not photographic in step S1343, next, in step S1345, whether or not the selection command generating according to the matching option currently selected by the user is "saturation" is determined. In the event that "saturation" is selected, the color conversion information for "saturation" in Profile 1 is selected in step S1346, and the flow ends. Accordingly, the CMS engine 323 shown in FIG. 10 uses the saturation 1334 which is color conversion information within Profile 133 in FIG. 12, for subsequent data processing.

Now, the present embodiment is being described with an example of four matching options, so the saturation color conversion information 334 and 337 within the Profile 1 denoted in FIG. 12 with reference numeral 331 and the Profile 2 denoted with reference numeral 332 are the same. Accordingly, the saturation color conversion information in Profile 2 can be used in step S1346. Also, handling five or more matching options can be dealt with by making the color conversion information 337 to be different from that of 334. This also holds true for the later-described colorimetric color conversion information 335 and 338.

In the event that the selection command generated according to the matching option currently selected by the user in step S1345 is not "saturation", next, in step S1347, the color conversion information for "colorimetric" in Profile 1 is selected, and the flow ends. Accordingly, the CMS engine 323 shown in FIG. 10 uses the colorimetric 335 which is color conversion information within Profile 1 in FIG. 12, denoted with reference numeral 331, for subsequent data processing.

According to the present embodiment as described above, with a printer system which performs color matching using multiple ICC-format-compliant profiles storing printer property information in the printer controller, a user selects four or more matching options, a command indicating the selection results according to the selected matching options made with the driver is sent to the printer controller, whereby correlating is performed for color information corresponding to the profile types and three matching options within the profiles selected at the controller by the command sent thereto, thereby automatically selecting profiles of which there are actually multiple types for performing image processing using the color information but without involving intentional selection thereby being carried out by the user. Thus, a user-friendly color processing system can be obtained.

That is to say, a user interface is provided wherein selecting profiles of which there are actually multiple types is automatically executed without intentional selection by the user, so the user only receives an impression that there is just one more matching option, which realizes a user-friendly color processing system.

Fourth Embodiment

The fourth embodiment will now be described in detail. Note that while the present embodiment will be described with reference to an example of printer profiles, this can be similarly applied to profiles regarding other devices, such as monitors, scanners, and so forth.

Figure 14:
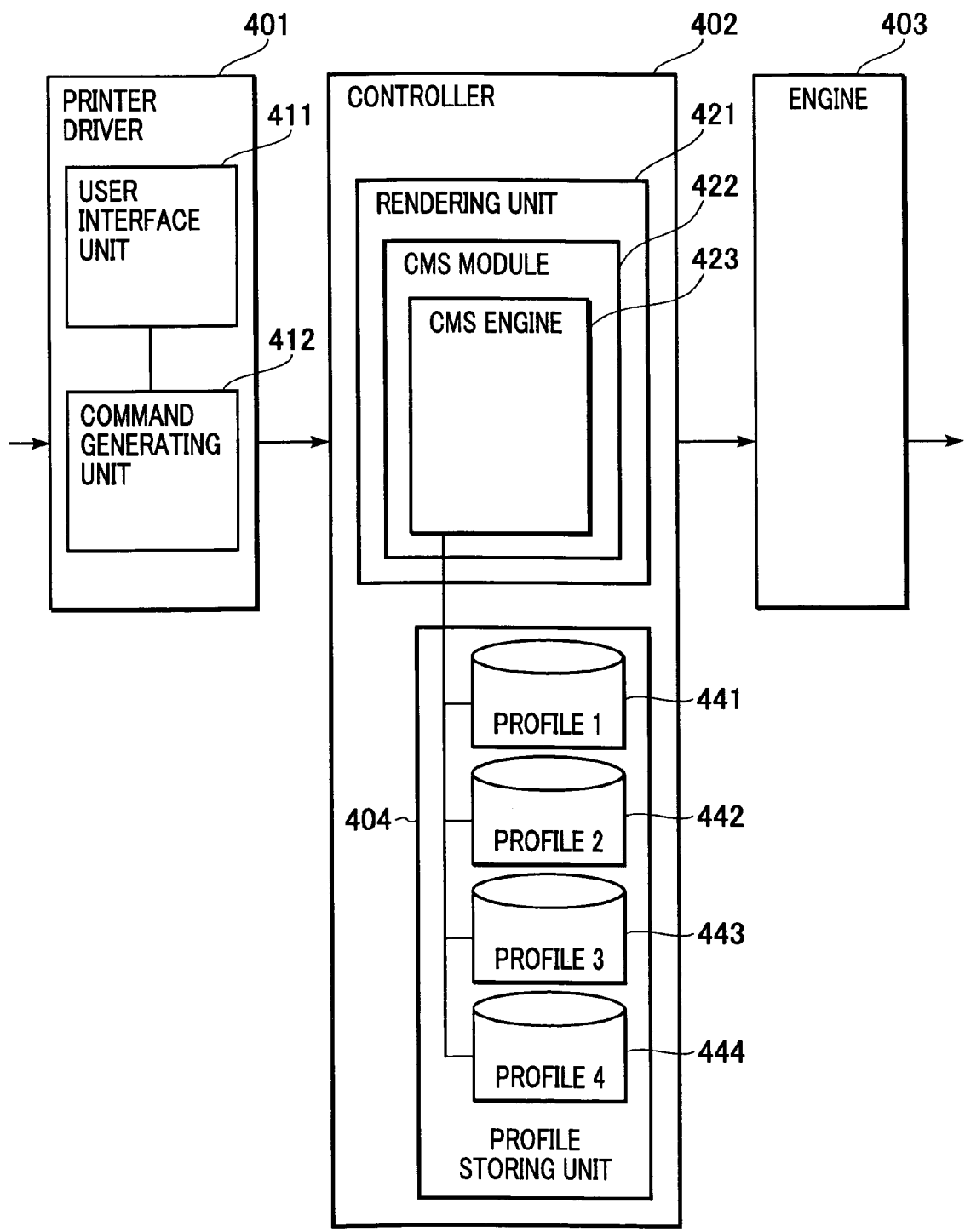
FIG. 14 is a block diagram illustrating a configuration example of a printing system according to a fourth embodiment.

FIG. 14 is a block diagram illustrating a configuration example of a printing system according to a fourth embodiment of the present invention. In FIG. 14, reference numeral 401 denotes a printer driver, and is configured of software for realizing the present system. The printer driver 401 is usually installed on a personal computer of a user, and is used for processing data transmitted from an upper layer such as an application or GDI making up a system or the like, though not shown in the drawings, and for ultimately creating data to be sent to the printer. Reference numeral 411 denotes a user interface unit which is part of the printer driver 401, for performing various settings by the user. Reference numeral 412 denotes a command generating unit which is within the printer driver 401, having a configuration for generating various commands to be sent to a later-described controller based on the settings made at the user interface unit 411, including data to be sent to the printer.

Reference numeral 402 denotes a controller making up part of the printer, for processing data including various types of commands, generated by the commend generating unit 412 and transmitted from the driver 401, and creating data to be ultimately sent to the later-described printer engine. The rendering unit 412 is part of the controller 402, for performing rendering such as logical drawing and so forth. The CMS module 422 is within the rendering unit 412, for performing color matching at the time of rendering. The CMS engine 423 is within the CMS module 422, for performing the actual color matching using later-described profiles. The printer engine 403 makes up a part of the printer, for processing the data transmitted from the controller 402, and outputting this onto paper. Reference numeral 404 denotes a profile storing unit which is part of the controller 402, for storing the later-described multiple profiles for performing color matching with the controller 402, normally kept at a specific region in the controller 402.

Reference numeral 441 denotes a Profile 1 which is stored in the profile storing unit 404 and is compliant with the ICC format. In the same way, reference numerals 442, 443, and 444 denote Profiles 2, 3, and 4, which are stored in the profile storing unit 404 and are compliant with the ICC format.

Note that in the present embodiment, the Profiles 1 and 2 indicated by the reference numerals 441 and 442 are profile types wherein a significant amount of toner is transferred, while the Profiles 3 and 4 indicated by the reference numerals 443 and 444 are profile types wherein a small amount of toner is transferred. Also, the profiles stored in the profile storing unit 404 may be installed at the plant before shipping, or may be downloaded from the personal computer of the user, using an application such as a profile downloader.

Now, the relation between ICC format profiles and matching options, and color information corresponding to the matching options, will be described with reference to FIG. 16.

In FIG. 16, let us say that reference numeral 1601 denotes the Profile 1 shown in FIG. 14, for example. As mentioned earlier, only three types of matching options can be used for one profile created compliant with the ICC format; perceptual, saturation, and colorimetric. Each of these are correlated with the color information denoted by reference numerals 1603, 1604, and 1605, respectively. That is to say, in the event that the perceptual option is selected with the Profile 1601 shown in FIG. 16, color conversion is performed using the stored color information 1603. "Color information" as stated here is configured of a LUT (look-up table) such as 3-input-4-output, but details thereof will not be described here. Also, the way in which the corresponding color information is used upon a matching option being selected is based on the configuration stipulated by ICC, and accordingly will not be discussed here.

Further, in FIG. 16, let us say that reference numeral 1602 denotes the Profile 2 shown in FIG. 14, for example. Each of the perceptual, saturation, and colorimetric matching options which can be used with the Profile 1602 are correlated with the color information denoted by reference numerals 1606, 1607, and 1608, respectively. Thus, both Profile 1601 and Profile 1602 have configurations wherein three matching options are correlated with their respective color information.

Profile 1601 and Profile 1602 are created as profile types wherein the amount of toner to be transferred is significant. While the following description will proceed using the example of the amount of toner, it is needless to say that with an arrangement wherein the printer engine 403 is an ink-jet printer, Profile 1601 and Profile 1602 would be profile types wherein a significant amount of ink is discharged.

Reference numerals 1609 and 1610 denote Profiles 3 and 4 in FIG. 14. The internal configuration is the same as the Profiles 1601 and 1602, but created as profile types wherein the amount of toner to be transferred is small. It is needless to say that with an arrangement wherein the printer engine 403 is an ink-jet printer, Profile 1609 and Profile 1610 would be profile types wherein a small amount of ink is discharged, so both profiles which use significant amounts of coloring material and profiles which use small amounts thereof are included in the present embodiment.

With profile types wherein the amount of toner to be transferred is significant, in the event that the input signals are RGB signals and gray data wherein the value of R (red), G (green), and B (blue) is the same, is to be processed, this gray data is ultimately realized by mixing C (cyan), M (magenta), Y (yellow), and K (black). In comparison with this, with profile types wherein the amount of toner to be transferred is small, in the event that the input signals are RGB signals and gray data wherein the value of R, G, and B, is the same, is to be processed, this gray data is realized by K alone. The difference between these two types of profiles may be manifested not only in the difference between gray processing, but also in maximal value restrictions in CMYK distribution obtained by processing secondary color input values such as R, G, and B, for example, or as maximal value restrictions in CMYK distribution obtained by processing other mixed color data.

Figure 15:
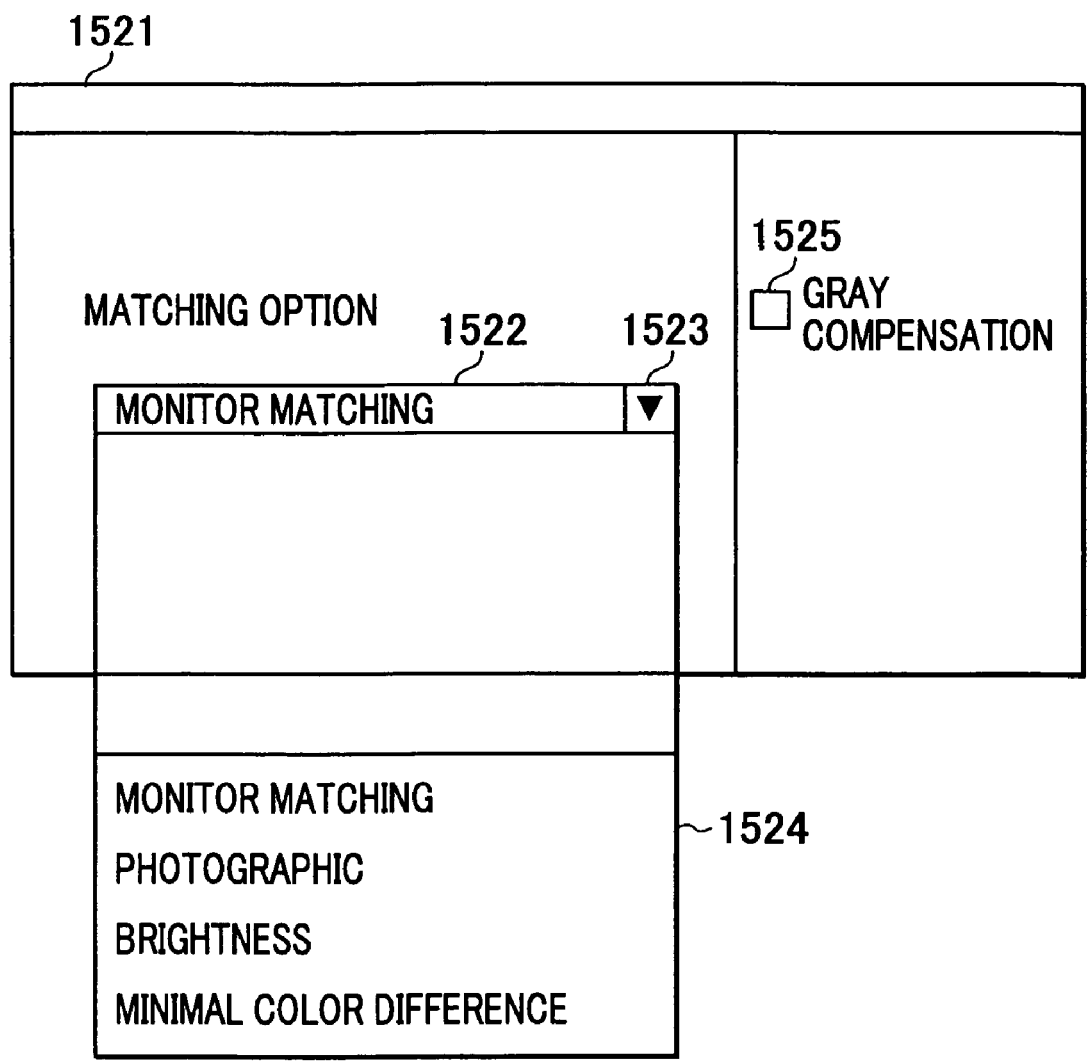
FIG. 15 is a diagram for describing a user interface for selecting matching options in the fourth embodiment.

Next, an example of selecting matching options with the printer driver user interface 411 will be described with reference to FIG. 15. In FIG. 15, reference numeral 1521 represents an example of a driver user interface window, whereby the user selects matching options from the window. Reference numeral 1522 denotes a portion in the window for displaying the currently-selected matching option, and reference numeral 1523 denotes a pull-down button at the right edge of the display potion 1522 in the window. Upon the user selecting the pull-down button 1523 with a pointing device such as a mouse, a pull-down menu with a list of matching options, such as that denoted by reference numeral 1524, is displayed. The user selects a desired matching option from the list in the pull-down menu 1524.

While the selections in the pull-down menu 1524 are normally three, the present embodiment allows this to be four or more. That is to say, color matching processing can be realized using color information stored in separate profiles, by selecting from the pull-down menu 1524.

Reference numeral 1525 denotes a checkbox in the window 1521 for selecting a toner transfer amount type with attributes other than the matching options, wherein checking this box means selecting a type with a small amount of toner transferred, and unchecking this box means selecting a type with a significant amount of toner transferred. Further, as yet another attribute, a profile may be selected wherein the user has changed (customized) the amount of inking-in of the profiles 1601 and 1602 (the ratio for substituting YMC with K). In this case, a checkbox for selecting the customized profile is displayed on the window 1521. Due to this configuration, the user can select matching options (color information) from profiles having the ink-in reproduction which the user desires, as the later-described four or more types of matching options.

Upon the matching options and the type of toner amount being selected with the user interface unit 411, the command generating unit 412 generates a selection command for selecting the matching options and the type of toner amount within the controller according to the selection, which is sent to the controller 402 at an optional timing.

The flow for profile handling processing in the controller 402 at the time of dealing with four or more types of matching options will be described with reference to the flowchart in FIG. 17. First, in step S1740, whether or not the profile type is that with a significant amount of toner or a small amount of toner is determined by whether or not the checkbox 1525 shown in FIG. 15 has been checked.

In the event that this is a type with a small amount of toner, next, in step S1741, whether the selection command which is created at the command creating unit 412 and transmitted according to the matching option displayed in the display portion 1522 in FIG. 15, i.e., the matching option currently selected by the user, is monitor matching or not, is determined first. In the event that monitor matching is selected, "perceptual" in Profile 1 is selected in step S1742, and the flow ends. Accordingly, the CMS engine 413 shown in FIG. 14 uses the perceptual 1603 which is color conversion information within Profile 1, indicated by reference numeral 1601 in FIG. 15, for subsequent data processing.

In the event that the selection command generated according to the matching option currently selected by the user is not monitor matching in step S1741, next, in step S1743, whether or not the selection command generated according to the matching option currently selected by the user is "photographic" is determined. In the event that "photographic" is selected, the color conversion information for "perceptual" in Profile 2 is selected in step S1744, and the flow ends. Accordingly, the CMS engine 423 uses the perceptual 1606 which is color conversion information within Profile 2, indicated by reference numeral 1602 in FIG. 16, for subsequent data processing.

In the event that the selection command generated according to the matching option currently selected by the user is not photographic in step S1743, next, in step S1745, whether or not the selection command generated according to the matching option currently selected by the user is "saturation" is determined. In the event that "saturation" is selected, the color conversion information for "saturation" in Profile 1 is selected in step S1746, and the flow ends. Accordingly, the CMS engine 423 shown in FIG. 14 uses the saturation 1604 which is color conversion information within Profile 1, indicated by reference numeral 1601 in FIG. 16, for subsequent data processing.

Now, the present embodiment is being described with an example of four matching options, so the saturation color conversion information 1604 and 1607 within the Profile 1 denoted in FIG. 16 with reference numeral 1601 and the Profile 2 denoted with reference numeral 1602 are the same. Accordingly, the saturation color conversion information in Profile 2 can be used in step S1746. Also, handling five or more matching options can be dealt with by making the color conversion information 1607 to be different from that of 1604. This also holds true for the later-described colorimetric color conversion information 1605 and 1608.

In the event that the selection command generated according to the matching option currently selected by the user in step S1745 is not "saturation", next, in step S1747, the color conversion information for "colorimetric" in Profile 1 is selected, and the flow ends. Accordingly, the CMS engine 423 shown in FIG. 14 uses the colorimetric 1605 which is color conversion information within Profile 1, indicated by reference numeral 1601 in FIG. 16, for subsequent data processing.

In the event that the checkbox 1525 in FIG. 15 is checked in step S1740, meaning that the profile is a type with a significant amount of toner, next, in step S1748, whether the selection command generated according to the matching option displayed in the display portion 1522 in FIG. 15, i.e., the matching option currently selected by the user, is monitor matching or not, is determined first. In the event that monitor matching is selected, "perceptual" in Profile 3 is selected in step S1749, and the flow ends. Accordingly, the CMS engine 423 shown in FIG. 14 uses the perceptual 1611 which is color conversion information within Profile 3, indicated by reference numeral 1609 in FIG. 16, for subsequent data processing.

In the event that the selection command generated according to the matching option currently selected by the user is not monitor matching in step S1748, next, in step S17410, whether or not the selection command generated according to the matching option currently selected by the user is "photographic" is determined. In the event that "photographic" is selected, the color conversion information for "perceptual" in Profile 4 is selected in step S17411, and the flow ends. Accordingly, the CMS engine 423 uses the perceptual 1614 which is color conversion information within Profile 4, indicated by reference numeral 1610 in FIG. 16, for subsequent data processing.

In the event that the selection command generated according to the matching option currently selected by the user is not photographic in step S17410, next, in step S17412, whether or not the selection command generated according to the matching option currently selected by the user is "saturation" is determined. In the event that "saturation" is selected, the color conversion information for "saturation" in Profile 3 is selected in step S17413, and the flow ends. Accordingly, the CMS engine 423 shown in FIG. 14 uses the saturation 1612 which is color conversion information within Profile 3, indicated by reference numeral 1609 in FIG. 16, for subsequent data processing. Thus, in step S17413, the saturation color conversion information 1615 of Profile 4 may be used as instead. This also holds true for the later-described colorimetric color conversion information 1613 and 1616.

In the event that the selection command generated according to the matching option currently selected by the user in step S17412 is not "saturation", next, in step S17414, the color conversion information for "colorimetric" in Profile 3 is selected, and the flow ends. Accordingly, the CMS engine 423 shown in FIG. 14 uses the colorimetric 1613 which is color conversion information within Profile 3, indicated by reference numeral 1613 in FIG. 16, for subsequent data processing.

According to the present embodiment as described above, with a printer system which performs color matching using multiple ICC-format-compliant profiles storing printer property information in the printer controller, a user selects four or more matching options and selects an optional profile from the plurality of profiles with attributes other than the matching options, a command indicating the selection results according to the selections made with the driver is sent to the printer controller, whereby correlating is performed for color information corresponding to the profile types and three matching options within the profiles selected at the controller by the command sent thereto, and image processing is performed using this color information.

That is to say, a user interface is provided wherein selecting profiles of which there are actually multiple types is automatically executed internally without intentional selection by the user, while further automatically selecting and processing the data along with information relating to the necessary amount of toner, so the user only receives an impression that there is just one more matching option, which realizes a user-friendly color processing system. Specifically, four types of matching options are displayed on the user interface, and in the event that the fourth option is selected, the controller automatically makes reference to a separate profile based on the corresponding selection commands, while taking into consideration the currently-selected toner amount. Thus, a user-friendly color processing system can be obtained.

Further, the present invention may be applied to a system configured of multiple devices, or to an apparatus formed of a single device. Also, it is needless to say that the present invention can also be achieved by supplying a program to a system or device. In this case, the recording medium storing the program according to the present invention makes up the present invention. The program is read into the system or device from the recording medium, whereby the system or device operates in a predetermined manner.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image processing apparatus which performs color matching using a plurality of profiles, said color image processing apparatus comprising:
    first selecting means for a user to select a color matching option from four or more color matching options among perceptual options, colorimetric options and saturation options in a first ICC profile and in a second ICC profile;
    second selecting means for a user to select an attribute, the attribute being different than the color matching options that are selected by the first selecting means; and
    image processing means for performing color matching based on the color matching option selected by the user via the first selecting means and the attribute selected by the user via the second selecting means,
    wherein the four or more color matching options are displayed simultaneously.

2. A color image processing apparatus according to claim 1, further comprising a user interface for said first and second selecting means.

3. A color image processing apparatus according to claim 1, wherein either the first ICC profile, in which the amount of color material is a first amount, or the second ICC profile, in which the amount of color material is a second amount, is selected based on the attribute selected by the second selecting means.

4. A color image processing apparatus according to claim 1, wherein either the first ICC profile, in which the amount of inking-in is a first amount, or the second ICC profile, in which the amount of inking-in is a second amount, is selected based on the attribute selected by the second selecting means.

5. Computer-executable process steps for performing color matching using a plurality of profiles, the computer-executable steps comprising:
    a first selection step for selecting a color matching option from four or more color matching options among perceptual options, colorimetric options and saturation options in a first ICC profile and in a second ICC profile;
    a second selection step for selecting an attribute, the attribute being different than the color matching options that are selected in the first selection step; and
    an image processing step for performing color matching based on the color matching option selected in the first selection step and the attribute selected in the second selection step,
    wherein the four or more color matching options are displayed simultaneously.

6. Computer-executable process steps according to claim 5, further comprising a step for providing a user interface corresponding to said first and second selection steps.

7. Computer-executable process steps according to claim 5, wherein, either the first ICC profile, in which the amount of color material is a first amount, or the second IC profile, in which the amount of color material is a second amount, is selected based on the attribute selected in the second selecting step.

8. Computer-executable process steps according to claim 5, wherein either the first ICC profile, in which the amount of inking-in is a first amount, or the second ICC profile, in which the amount of inking-in is a second amount, is selected based on the attribute selected in the second selecting step.

9. A color image processing method for performing color matching using a plurality of profiles, the color image processing method comprising:
    obtaining input from a user for selecting a color matching option from four or more color matching options among percertual options, colorimetric options and saturation options in first ICC profile and in second ICC profile;
    obtaining input from the user for selecting an attribute, the attribute being different than the color matching options; and
    performing color matching based on the selected color matching option and the selected attribute,
    wherein the four or more color matching options are displayed simultaneously.

10. A color image processing method according to claim 9, further comprising providing a user interface for obtaining input from the user.

11. A color image processing method according to claim 9, wherein either the first ICC profile, in which the amount of color material is a first amount, or the second ICC profile, in which the amount of color material is a second amount, is selected based on the attribute.

12. A color image processing method according to claim 9, wherein either the first ICC profile, in which the amount of inking-in is a first amount, or the second ICC profile, in which the amount of inking-in is a second amount, is selected based on the attribute.

* * * * *